(12) United States Patent
Flores Aviña et al.

(10) Patent No.: US 11,541,873 B2
(45) Date of Patent: Jan. 3, 2023

(54) SYSTEMS AND METHODS FOR MONITORING DEGRADATION ASSOCIATED WITH MOUNTS FOR TORQUE-SUPPLYING DEVICES

(71) Applicant: Ford Global Technologies, LLC, Dearborn, MI (US)

(72) Inventors: Kristian Ulyses Flores Aviña, Mexico City (MX); Luis Felipe Blas Martínez, Jilotepec (MX); Miguel Angel Leon Guerrero, Ecatepec de Morelos (MX); Enrique Lopez Hernandez, Toluca (MX)

(73) Assignee: Ford Global Technologies, LLC, Dearborn, MI (US)

(*) Notice: Subject to any disclaimer, the term of this patent is extended or adjusted under 35 U.S.C. 154(b) by 471 days.

(21) Appl. No.: 16/659,416

(22) Filed: Oct. 21, 2019

(65) Prior Publication Data
US 2021/0114583 A1  Apr. 22, 2021

(51) Int. Cl.
*B60W 20/50* (2016.01)
*B60W 50/04* (2006.01)
(Continued)

(52) U.S. Cl.
CPC .............. *B60W 20/50* (2013.01); *B60K 6/22* (2013.01); *B60K 8/00* (2013.01); *B60W 50/04* (2013.01);
(Continued)

(58) Field of Classification Search
CPC .... B60W 20/50; B60W 50/04; B60W 30/182; B60W 2400/00; B60W 2422/95; B60W 10/06; B60W 10/08; B60W 20/15; B60W 50/00; B60W 2050/0043; B60W 2710/0666; B60W 2710/083; B60K 6/22; B60K 8/00; B60K 5/1208; G01C 21/26;
(Continued)

(56) References Cited

U.S. PATENT DOCUMENTS 9,989,076 B2  6/2018 Samad
10,328,944 B2  6/2019 Dudar
(Continued)

FOREIGN PATENT DOCUMENTS

CN    203368363 U    12/2013
WO    2013028092 A1    2/2013

*Primary Examiner* — Hussein Elchanti
(74) *Attorney, Agent, or Firm* — Vincent Mastrogiacomo; McCoy Russell LLP

(57) ABSTRACT

Methods and systems are provided for using energy harvesting modules as a means for providing energy to power an electrical load and/or as a means for monitoring an operational state of a component or components to which the energy harvesting module is coupled. In one example, a method includes, via a controller, monitoring an actual amount of energy generated by an energy harvesting module attached to a mounting structure that is used to secure a torque-supplying machine to a frame, comparing the actual amount to an expected amount, and indicating degradation of the mounting structure and/or the torque-supplying machine based on the comparing. In this way, the energy harvesting modules may both power electrical loads and simultaneously serve as a monitor for component degradation.

15 Claims, 14 Drawing Sheets

(51) Int. Cl.
*G07C 5/02* (2006.01)
*G01C 21/26* (2006.01)
*B60K 6/22* (2007.10)
*G07C 5/08* (2006.01)
*B60K 8/00* (2006.01)
*B60W 30/182* (2020.01)

(52) U.S. Cl.
CPC .............. *G01C 21/26* (2013.01); *G07C 5/02* (2013.01); *G07C 5/0808* (2013.01); *B60W 30/182* (2013.01); *B60W 2400/00* (2013.01); *B60W 2422/95* (2013.01); *B60Y 2200/92* (2013.01); *G08C 2201/112* (2013.01)

(58) Field of Classification Search
CPC .... G07C 5/02; G07C 5/0808; B60Y 2200/92; G08C 2201/112
See application file for complete search history.

(56) References Cited

U.S. PATENT DOCUMENTS

| | | | | |
|---|---|---|---|---|
| 2013/0221742 | A1* | 8/2013 | Palumbo | B60L 53/00 307/9.1 |
| 2015/0046031 | A1* | 2/2015 | Gagliano | B60G 7/02 280/124.157 |
| 2017/0232956 | A1* | 8/2017 | Cadwell | B60W 10/06 701/111 |
| 2018/0354353 | A1* | 12/2018 | Dudar | B60W 10/06 |
| 2019/0118633 | A1* | 4/2019 | Chen | B60K 5/1233 |
| 2019/0389508 | A1* | 12/2019 | Varunjikar | B62D 6/10 |
| 2020/0011687 | A1* | 1/2020 | Lindemann | G07C 5/02 |

* cited by examiner

FIG. 6A

| Drive cycle | Energy-harvesting module 1 (mA) | Energy-harvesting module 2 (mA) |
|---|---|---|
| A | 20 | 20.2 |
| B | 40 | 38 |
| C | 5 | 3 |
| D | 100 | 110 |
| E | 240 | 235 |
| F | 25 | 30 |
| G | 85 | 91 |
| H | 150 | 140 |

FIG. 6B

| Drive cycle D | | | |
|---|---|---|---|
| Segment # | Module 1 (mA) | Category | Engine Mount mode |
| Segment 1 | 25 | City driving | Dampening |
| Segment 2 | 10 | Highway driving (non-congested) | Stiffening |
| Segment 3 | 45 | Highway driving (stop and go) | Dampening |
| Segment 4 | 20 | Bumpy road (numerous speed bumps) | Dampening |
| Total | 100 | | |

SYSTEMS AND METHODS FOR MONITORING DEGRADATION ASSOCIATED WITH MOUNTS FOR TORQUE-SUPPLYING DEVICES

FIELD

The present description relates generally to methods and systems for using energy harvesting for identifying degradation associated with mounts coupled to a torque supplying device or machine.

BACKGROUND/SUMMARY

Hybrid electric vehicles (HEVs) and plug-in hybrid electric vehicles (PHEVs) are powered by an internal combustion engine in combination with one or more electric motors that utilize energy stored in onboard energy storage devices (e.g., batteries). For such vehicles, power provided via the electric motor(s) may allow for a smaller engine. The onboard energy storage device may power auxiliary loads including but not limited to onboard infotainment systems, vehicle headlights, air conditioning compressors, etc. In some examples, such vehicles may discontinue engine operation at idle stops. Together the above-mentioned features may result in improved fuel economy without sacrificing performance.

For such vehicles, energy management is a key operational parameter for enabling efficient combined use of the engine and the onboard energy storage device to improve fuel economy and reduce undesired emissions. Thus, it may be desirable to capture as much energy as possible for later use that would otherwise be lost. As one example, such vehicles may rely on regenerative braking strategies to capture energy otherwise lost during braking, by operating the electric motor as a generator and storing the captured energy at the onboard energy storage device. The captured energy may be later used when demanded, thereby improving fuel economy.

Embedding an energy harvesting material at particular locations within an automotive vehicle may provide an opportunity to increase energy efficiency for vehicles such as HEVs or PHEVs (or even battery electric vehicles (BEVs)). Toward this end, United States Patent application No. 20130221742 discloses organic polymer-based energy harvesting materials that may be applied to any surface of a vehicle that experiences contortion, compression, mechanical stress and/or strain, and/or vibration during operation. Resultant electrical energy generated via the energy harvesting materials may be used by a vehicle electrical system, or may be stored in an onboard energy storage device for later use.

However, while the retrieval of energy otherwise lost may be advantageous, there may be circumstances where the advantageous recuperation of energy may mask an underlying issue such as degradation of a vehicle component to which the energy harvesting material is attached. For example, a vibration mount (e.g., an engine mount, electric machine mount, transmission mount, etc.) configured to hold and support an engine (or electric machine, transmission, etc.) while isolating powertrain vibrations from a vehicle chassis may include an energy-harvesting material to recover energy from mechanical motion. In such an example, vibrational motion associated with the vibration mount may be converted via the energy harvesting material to electrical energy. However, in a situation where the vibration mount becomes degraded, the energy-harvesting material may continue to charge the onboard energy storage device and/or continue to supply other vehicle electrical-consuming components with power without any indication to a control system of the vehicle that the harvested energy is stemming from a degraded vibration mount.

Along similar lines, a component of a vehicle (including but not limited to a mounting structure such as a vibration mount) that includes an associated energy harvesting material may in some examples become degraded as a result of shipping/transport irregularities, whether the shipping/transport includes the entire vehicle or just a portion of a vehicle (e.g., engine and associated mounts and/or or electric machine and associated mounts and/or transmission and associated mounts). In such an example, when the particular component is eventually used (e.g., engine and associated mounts), the energy harvesting material may continue to recover energy, even though the component is not functioning as desired or expected.

The inventors have herein recognized the above-mentioned issues, and have herein developed systems and methods to at least partially address them. In one example, a method comprises via a controller, monitoring an amount of energy generated over a predetermined time frame by an energy harvesting module attached to a mounting structure that is used to secure a torque-supplying machine to a frame. The method may further include comparing the amount of energy generated to an expected amount of energy generation, and indicating degradation of the mounting structure and/or the torque-supplying machine based on the comparing. In this way, the energy generated over the predetermined time frame may be used to assess whether the mounting structure and/or torque-supplying machine is functioning as desired or expected.

As one example, the frame is a chassis of a vehicle and the torque-supplying machine is one of an engine, an electric machine, and a transmission. In such an example, the expected amount of energy generation may be learned over time as the vehicle is driven, and the predetermined time frame may be a single drive cycle of the vehicle. In another example, rather than the predetermined time frame being a single drive cycle of the vehicle, the predetermined time frame may be a time frame from when the vehicle is commenced being shipped not under its own power to a final destination. In either case, the controller may be a vehicle controller included as part of the vehicle.

As another example, the frame may be a packaging frame included in a package that the torque-supplying machine is to be shipped within, the torque-supplying machine secured to the packaging frame within the package. In such an example, the expected amount of energy generation may be based on one or more of a shipping route, a weight of the torque-supplying machine, a stiffness parameter of the mounting structure, and a composition of the energy harvesting module. In such an example, the controller may be a stand-alone controller included within the package that the torque-supplying machine is to be shipped in, and the stand-alone controller may be powered at least in part via the amount of energy generated over the predetermined time frame.

For such a method, the energy harvesting module may be comprised of a piezoelectric material. Furthermore, the controller may request mitigating action to be taken responsive to the degradation of the mounting structure and/or the torque-supplying machine, where the mitigating action may include servicing the mounting structure and/or the torque-supplying machine to correct the degradation.

The above advantages and other advantages, and features of the present description will be readily apparent from the following Detailed Description when taken alone or in connection with the accompanying drawings.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

FIG. 6A depicts an example lookup table that includes expected energy generation amounts from different energy harvesting modules for different learned drive cycles;

FIG. 6B depicts an example lookup table for a particular drive cycle that is segmented into driving categories;

DETAILED DESCRIPTION

Figure 1:
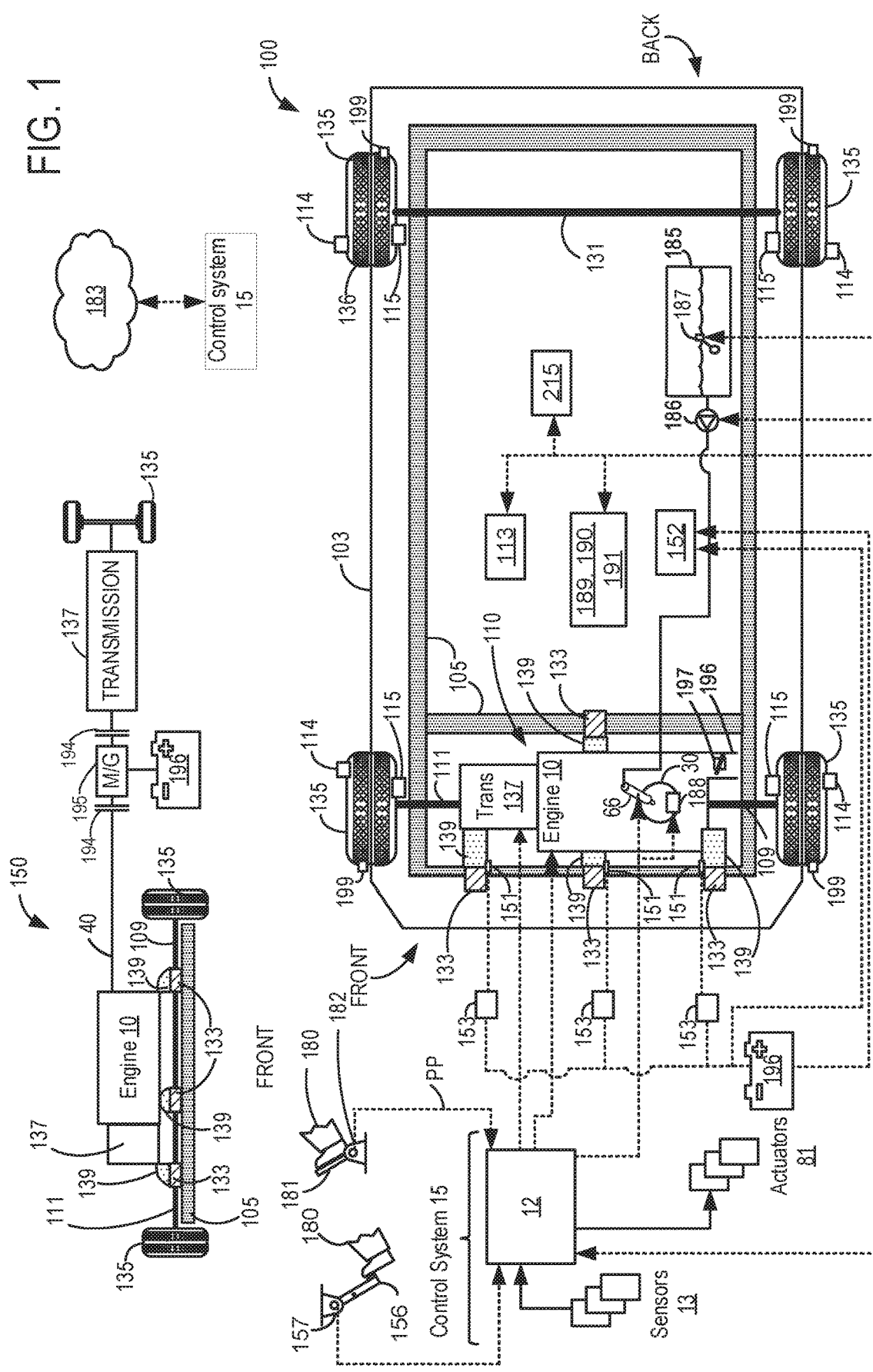
FIG. 1 schematically depicts an embodiment of a vehicle including a vehicle powertrain attached to a vehicle frame via one or more engine mounts.
Figure 2:
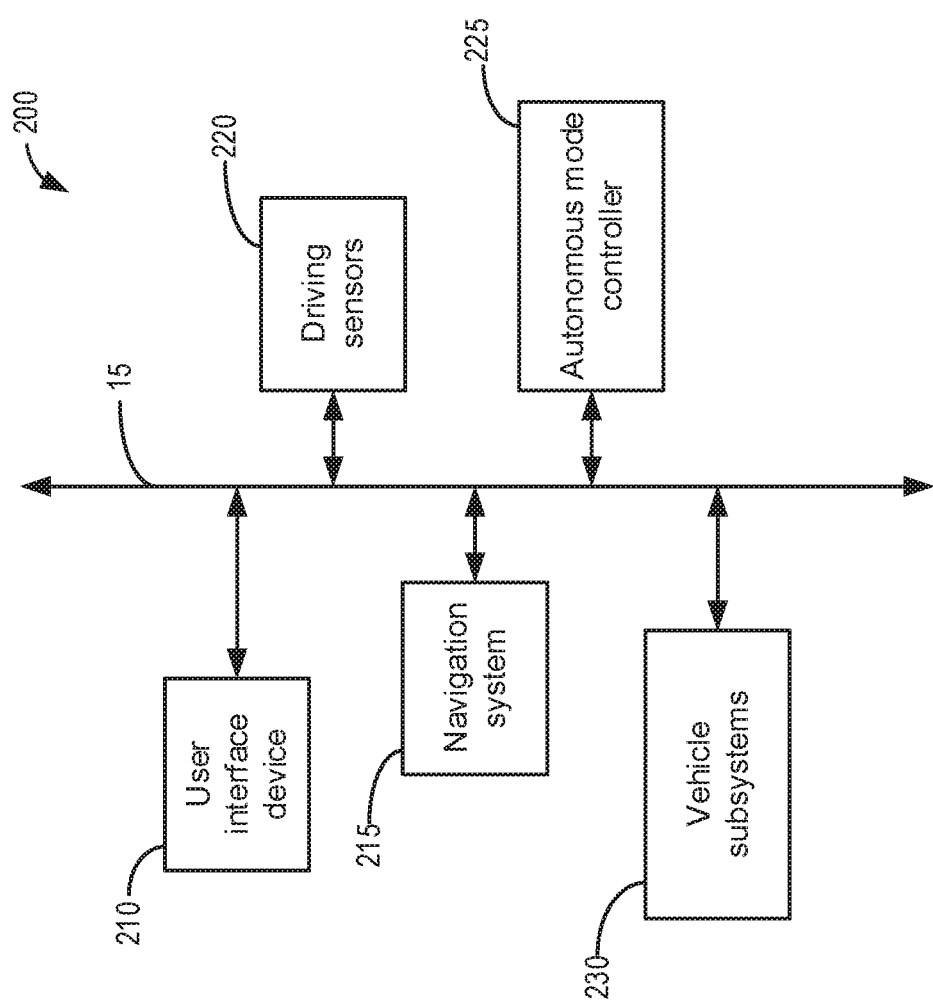
FIG. 2 schematically illustrates a block diagram of an example control system for the vehicle of FIG. 1.
Figure 3:
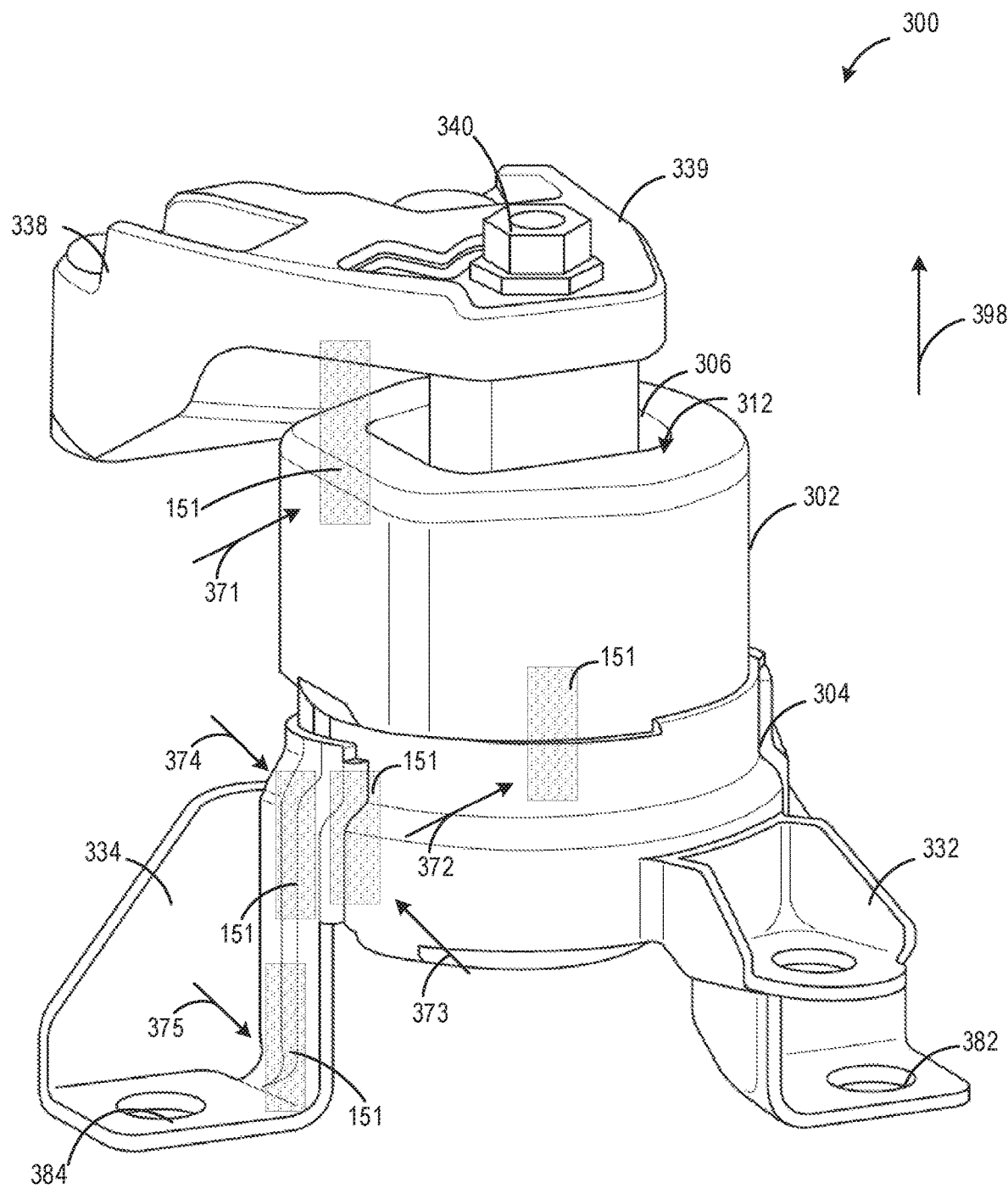
FIG. 3 shows an external view of vibration mount that may be included in the vehicle of FIG. 1.
Figure 4:
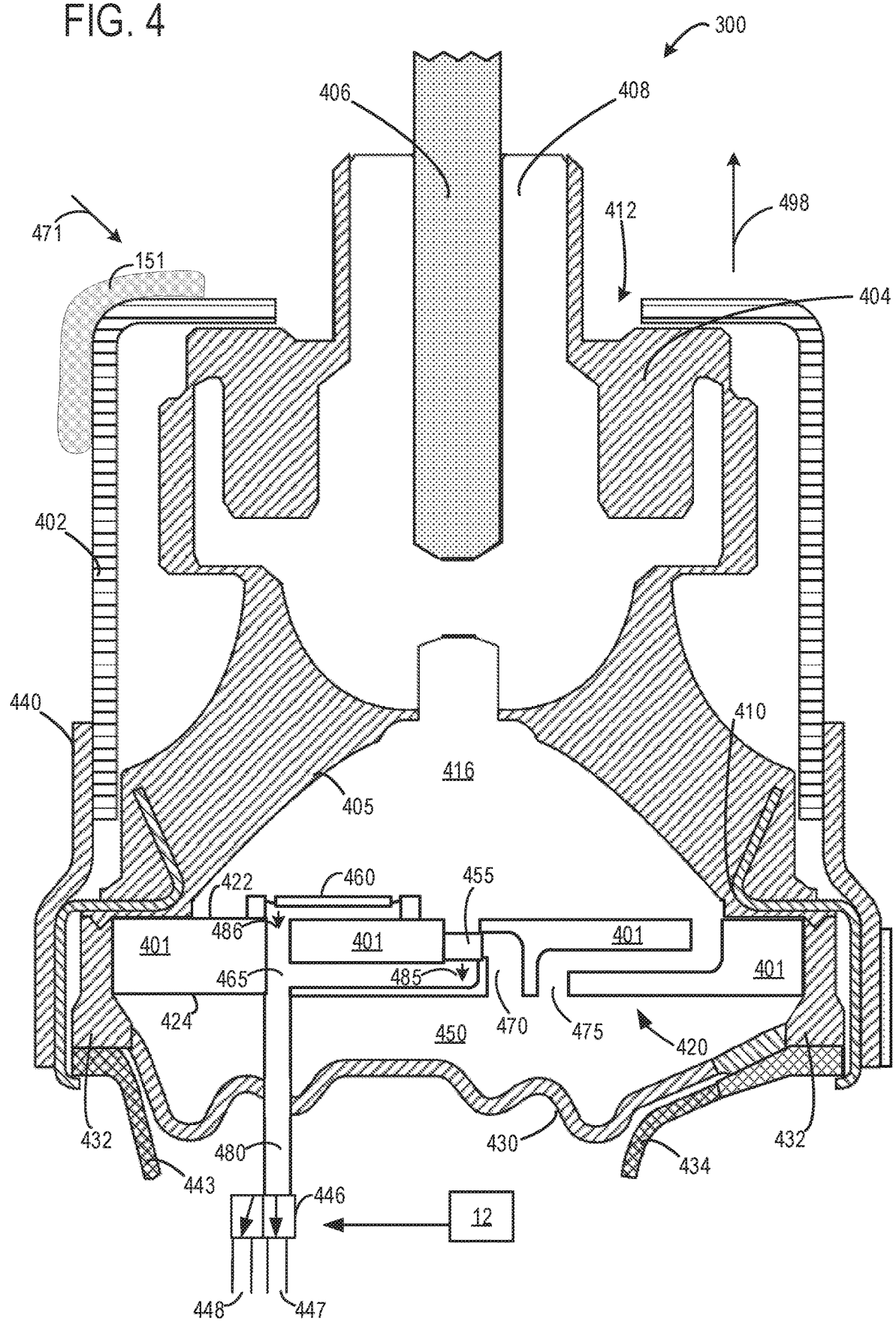
FIG. 4 shows a cross-sectional view of an example vibration mount that may be included in the vehicle of FIG. 1.

The following description relates to systems and methods for harvesting energy from energy harvesting modules that are coupled in some way (e.g., via a mount) to a torque-supplying machine (e.g., engine, pump, transmission, electric machine, torque converter, etc.). As one example, the torque-supplying machine is an engine included in a hybrid vehicle, where the engine is secured to a chassis of the vehicle via one or more engine mounts, to which the energy harvesting module(s) are physically coupled. Accordingly, depicted at FIG. 1 is an example of a hybrid electric vehicle that includes an engine, engine mounts, and associated energy harvesting modules. Discussed herein, the energy harvesting modules may translate mechanical motion to electrical energy (e.g., mechano-electric conversion), which may be used to power auxiliary electrical components and/or charge an onboard energy storage device (e.g., battery). The energy harvesting modules may also be relied upon for inferring degradation of, for example, the mounts that support the torque-supplying machine. As one example, expected energy generation for particular energy harvesting modules may be learned over time, for particular commonly traveled driving routines. Accordingly, such a vehicle may include components and instructions for learning commonly traveled driving routes and expected energy generation corresponding to the learned travel routes. FIG. 2 depicts a smart driving system that may be utilized to learn commonly traveled routes, for example. FIG. 3 shows an example external view of a vibration mount of the present disclosure, including potential locations with respect to the vibration mount that energy harvesting modules may be positioned. In some examples, the vibration mounts of the present disclosure may be active vibration mounts, whose properties may be actively controlled. A cross-sectional view of one example of such an active vibration mount is depicted at FIG. 4.

Figure 5:
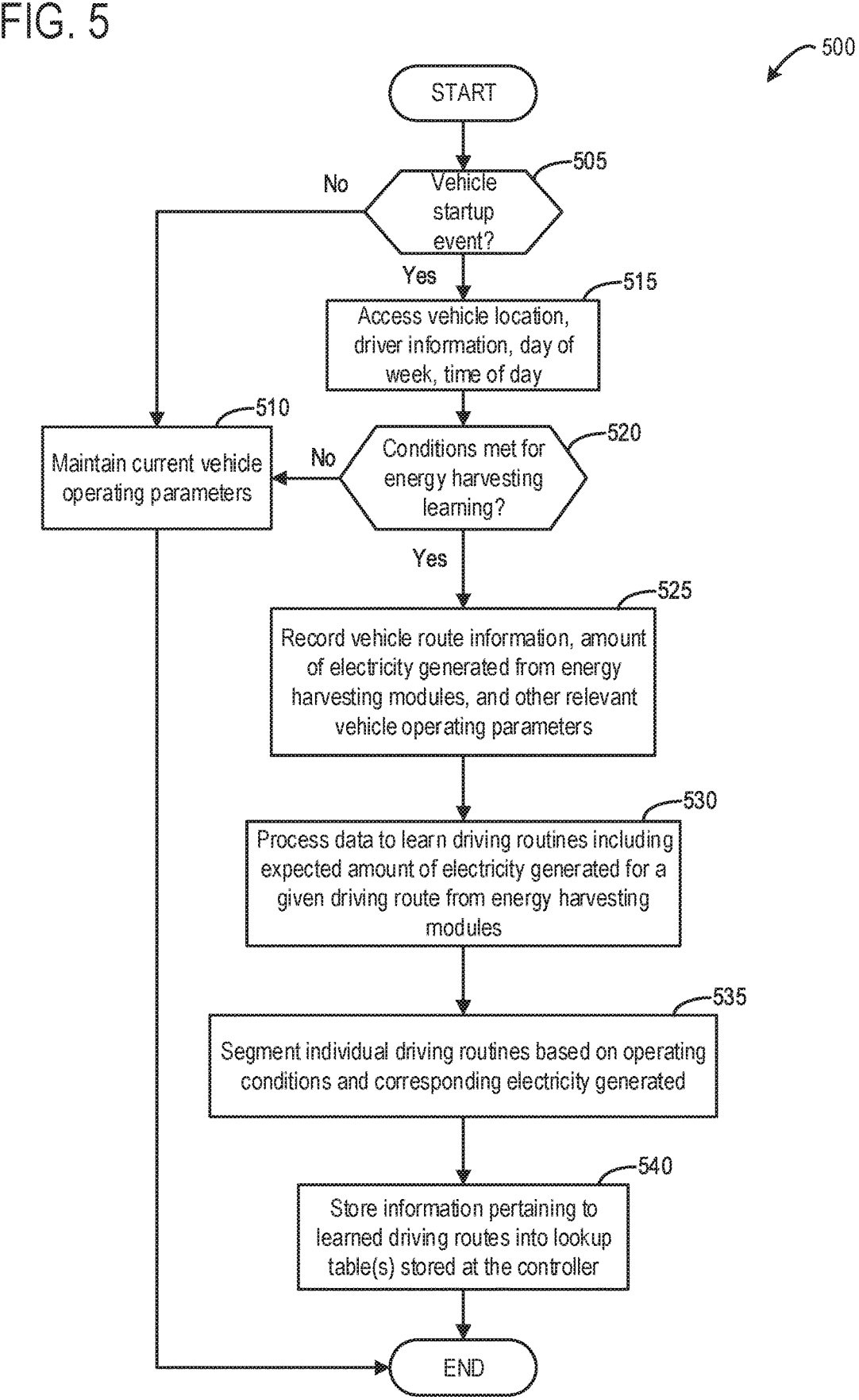
FIG. 5 depicts a high-level example method for learning driving routines and expected energy generation from energy harvesting module(s) coupled to vibration mount(s) of the present disclosure.

FIG. 5 depicts a high-level example method that may be used to learn commonly traveled driving routes, along with associated expected energy generation from energy harvesting module(s), as mentioned above. Data acquired via the methodology of FIG. 5 may be stored at one or more lookup tables, as illustratively depicted at FIGS. 6A-6B. The stored data may be compared to actual energy generation monitored during particular drive cycles, in order to infer whether a vibration mount is potentially degraded, as illustrated via the methods shown at FIGS. 7-8.

Figure 9:
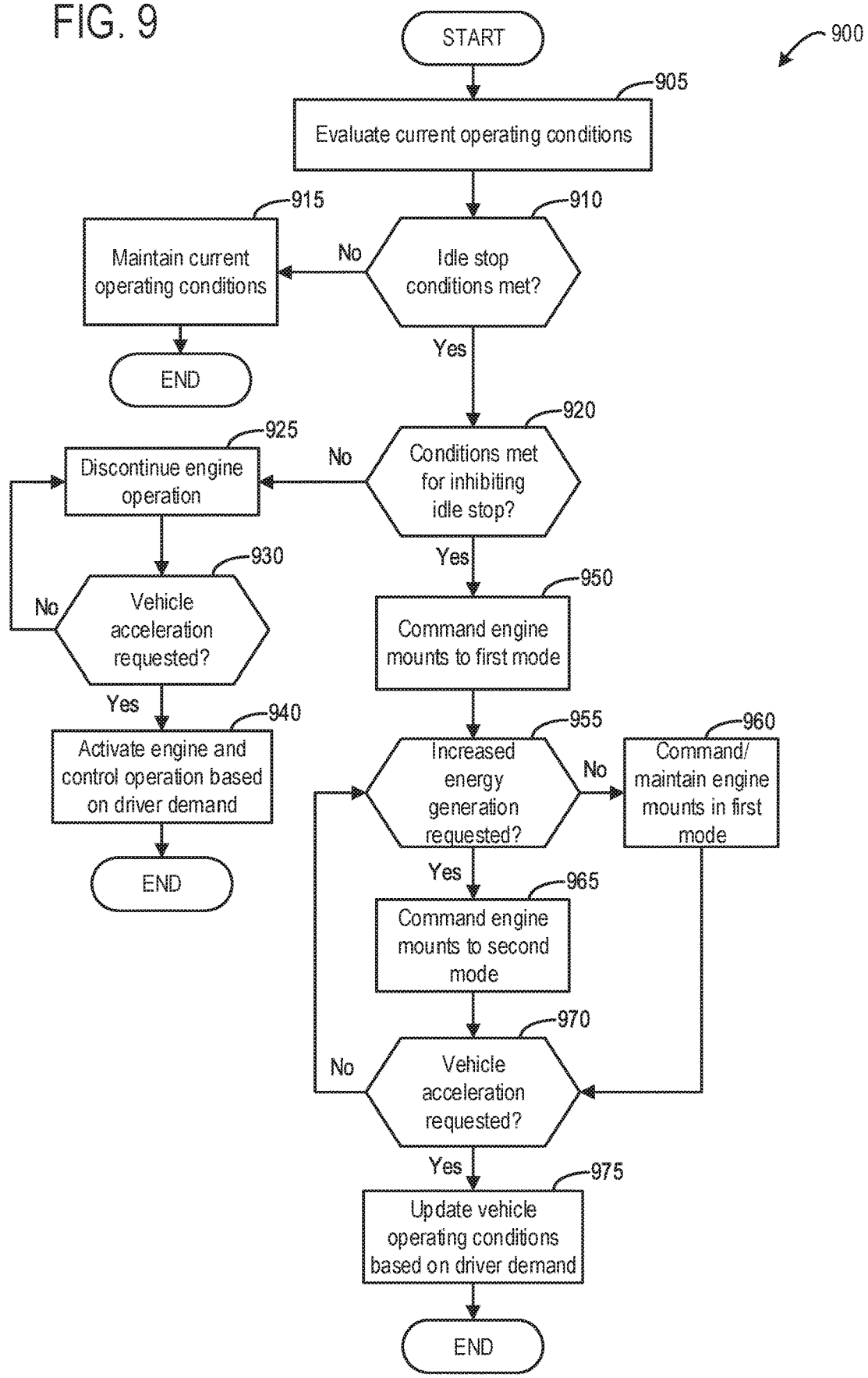
FIG. 9 depicts a high-level example method for controlling an vibration mount to a mode that results in increased energy generation via an associated energy harvesting module.

In some examples where the vibration mounts with associated energy harvesting module(s) are active vibration mounts, controllable to different operational modes, it may be desirable to control the modes in a manner that results in increased energy generation via the energy harvesting module(s). For example, there may be increased mechanical motion for a particular vehicle operating condition, when the active vibration mount(s) are commanded to one mode as opposed to another. This may enable on-demand increased energy generation, useful for example in cases where a state of charge of an onboard energy storage device (e.g., battery) is below some predetermined threshold. An example method for actively commanding increased energy generation from one or more energy harvesting modules by controlling a state of an associated vibration mount is depicted at FIG. 9.

Figure 10:
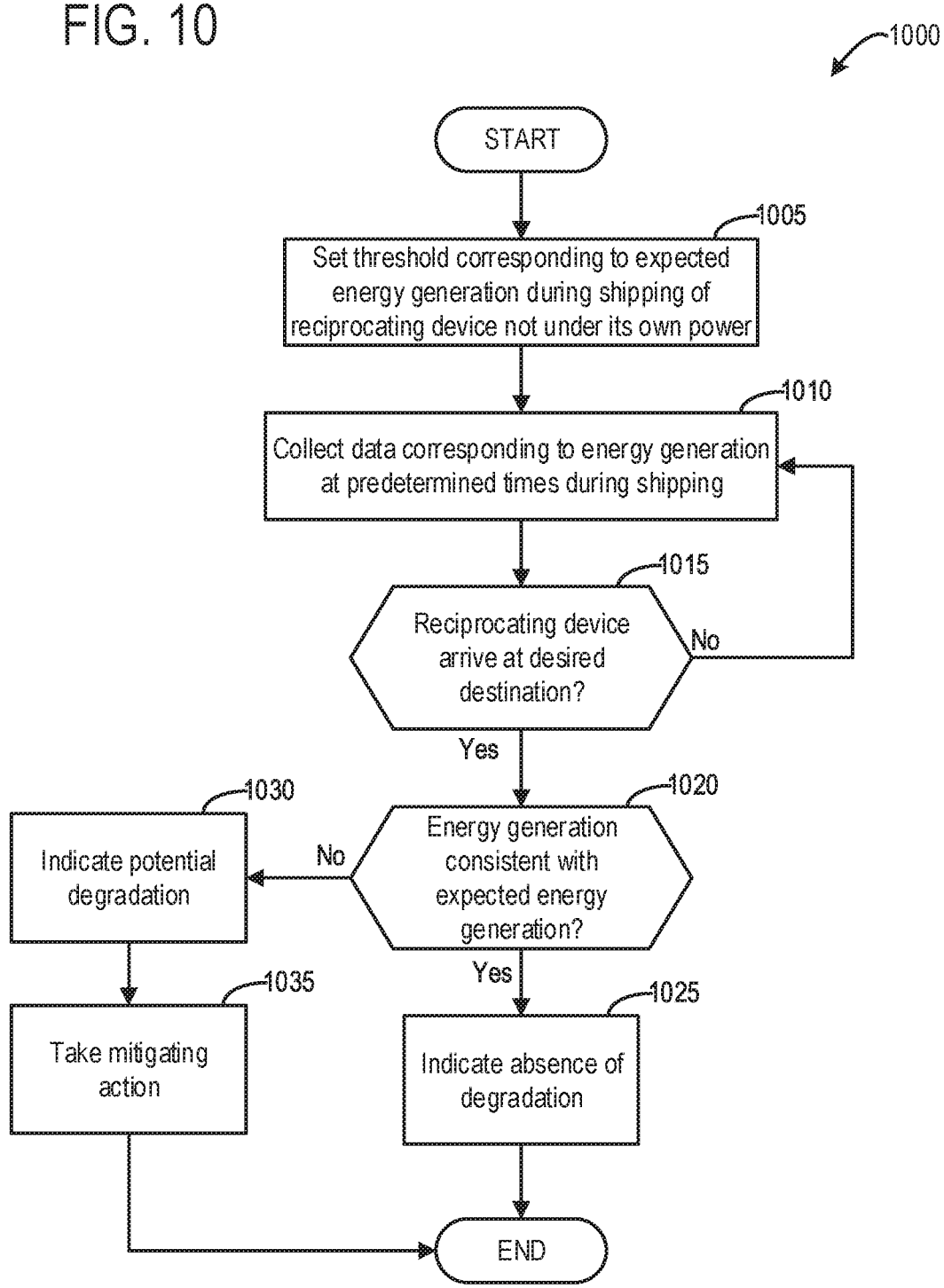
FIG. 10 depicts a high-level example method for inferring degraded shipping of a torque-supplying machine such as an engine.
Figure 14:
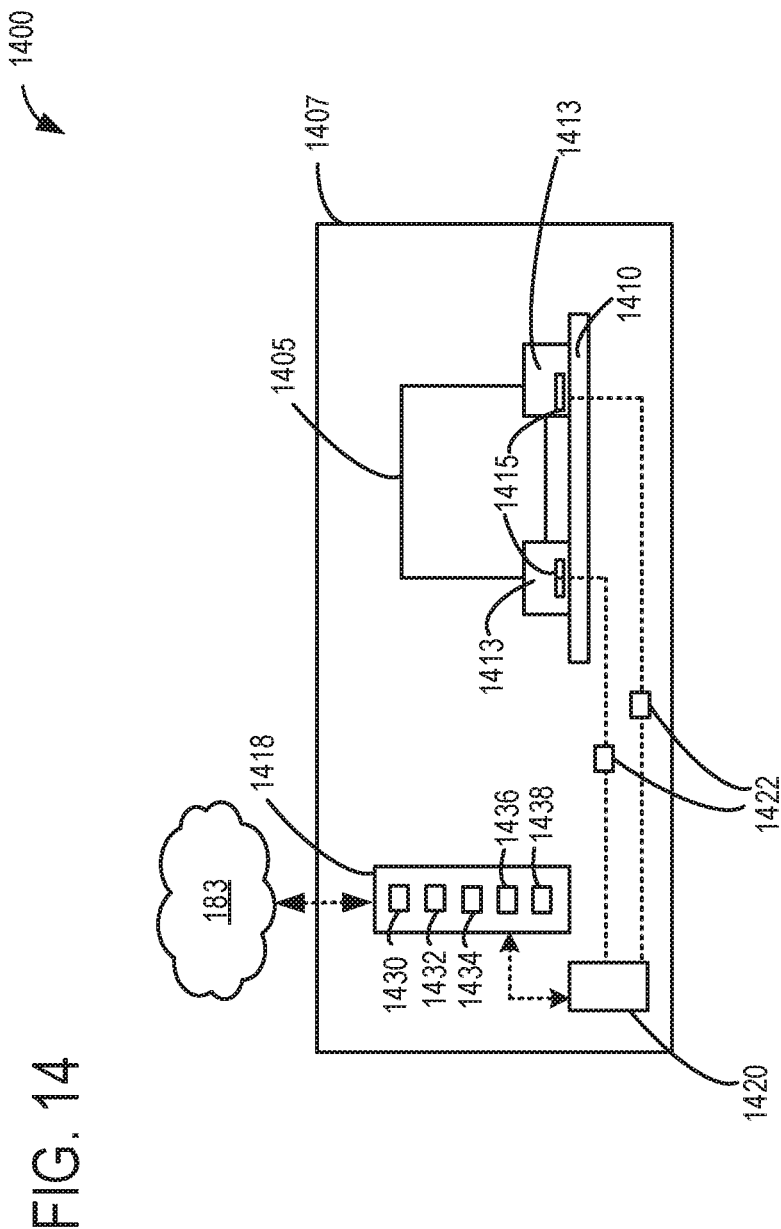
FIG. 14 depicts an example illustration of how a stand-alone controller may be included in a packaging of a torque-supplying machine for monitoring energy generation via an energy harvesting module during shipping of the torque-supplying machine.

It is further herein recognized that in some examples energy harvesting module(s) such as those discussed above may be used to monitor shipping of torque-supplying machines, where the torque-supplying machine is not in operation during the shipping. As one example, the torque-supplying machine may be an engine, and the engine may be included in a vehicle, where the entire vehicle is being shipped to a desired location. In such an example, the engine may be mounted to the vehicle's chassis via mounts that include energy harvesting modules, and a controller of the vehicle may be used to monitor energy generation via the energy harvesting modules during shipping. However, in other examples the torque-supplying machine may be shipped in isolation. In such an example, a stand-alone controller may be included in a package that the torque-supplying machine is shipped in, as depicted at FIG. 14. FIG. 10 depicts a high-level example method for using energy generated by one or more energy harvesting modules during shipping of a torque-supplying machine as a means of inferring instances of degraded shipping conditions (e.g., shipping conditions that may have resulted in degradation to one or more components (e.g., associated mounts or other relevant components) associated with the torque-supplying machine.

Figure 8:
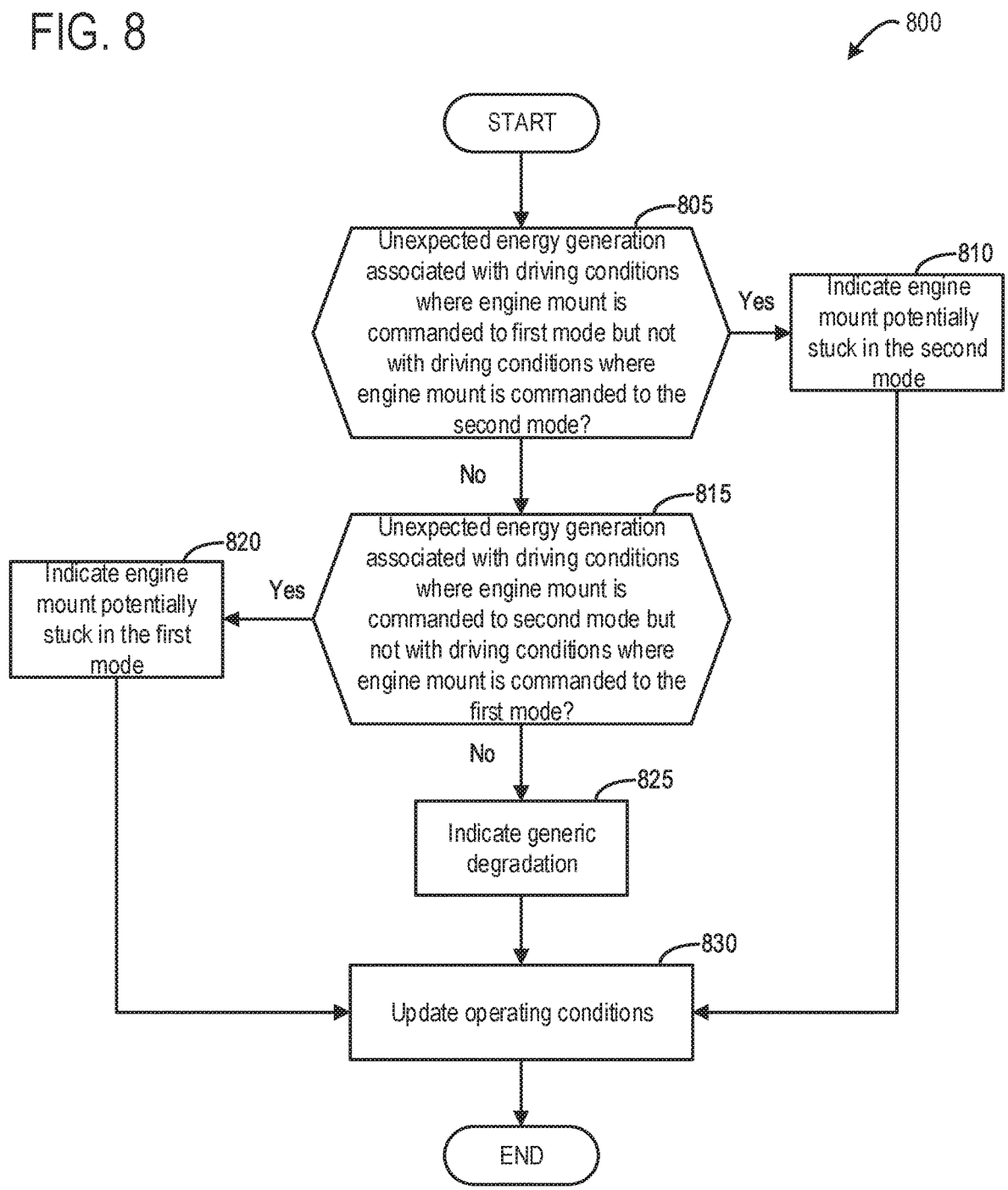
FIG. 8 depicts a sub-method of FIG. 7, that is used to infer whether degradation of the particular vibration mount is specific to a particular mode of vibration mount operation.
Figure 11:
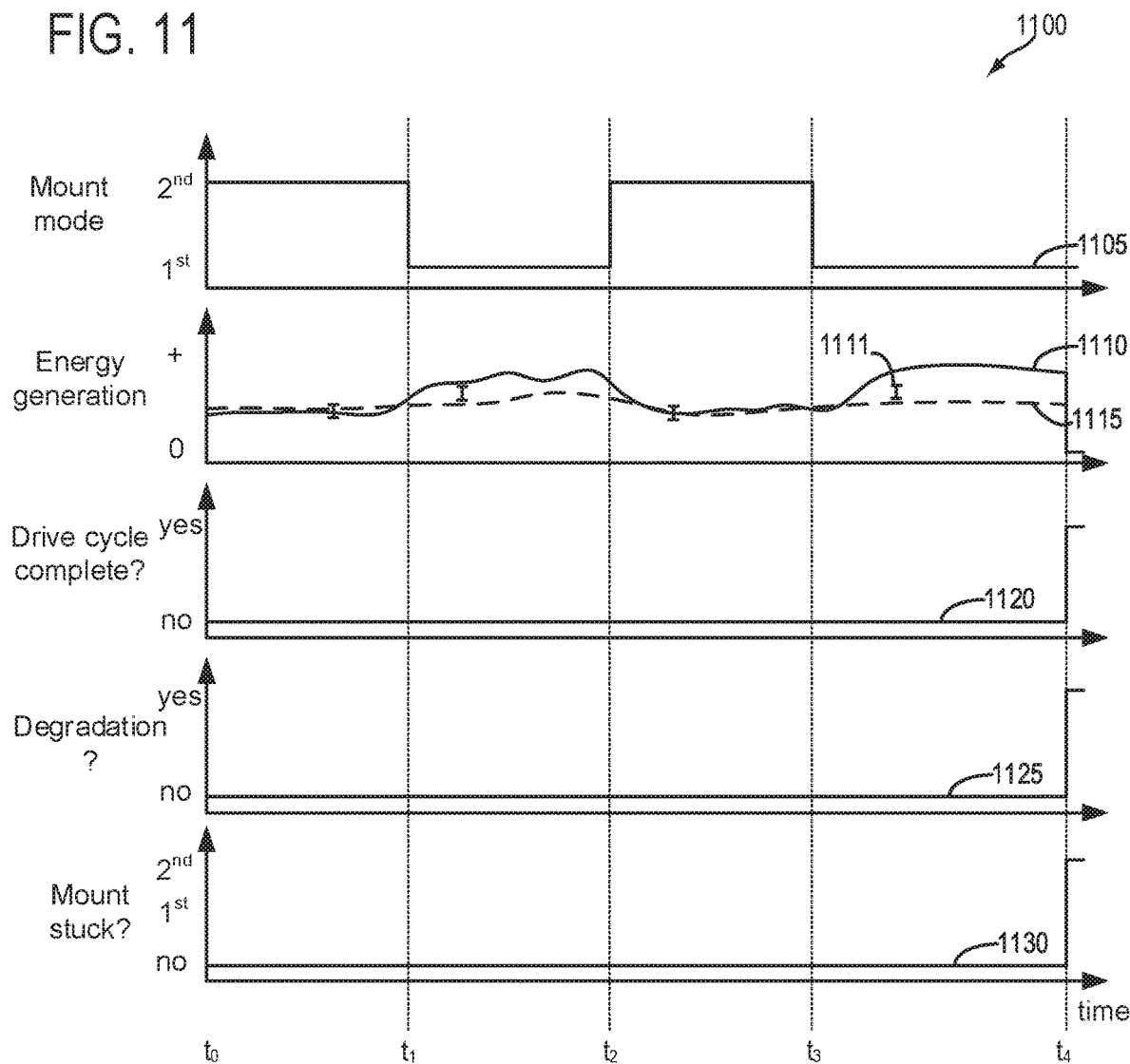
FIG. 11 depicts a prophetic example timeline for inferring degradation of a vibration mount, as per the methodology of FIGS. 7-8.
Figure 12:
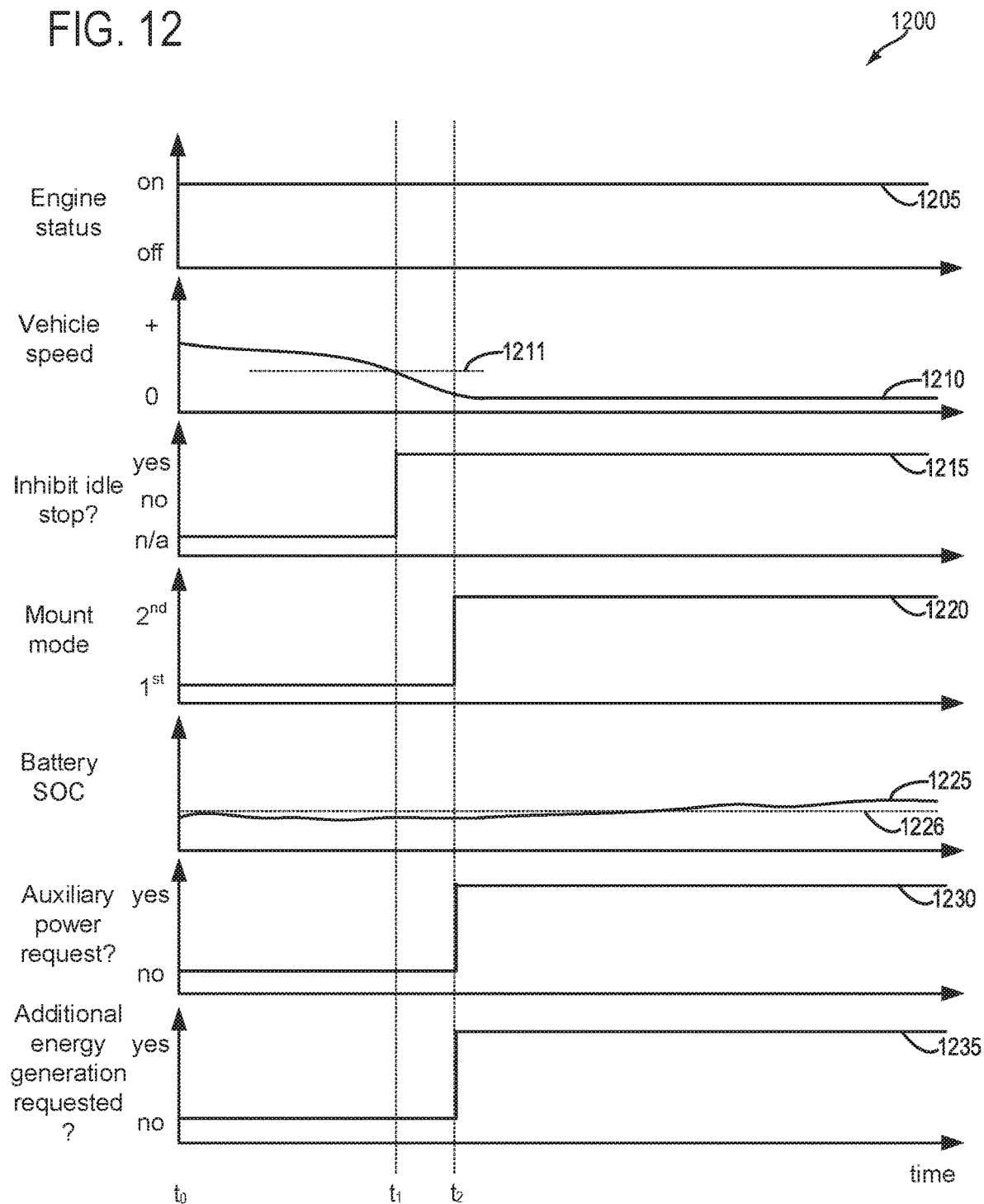
FIG. 12 depicts a prophetic example timeline for actively controlling a vibration mount in a manner that results in increased energy generation from an associated energy harvesting module.
Figure 13:
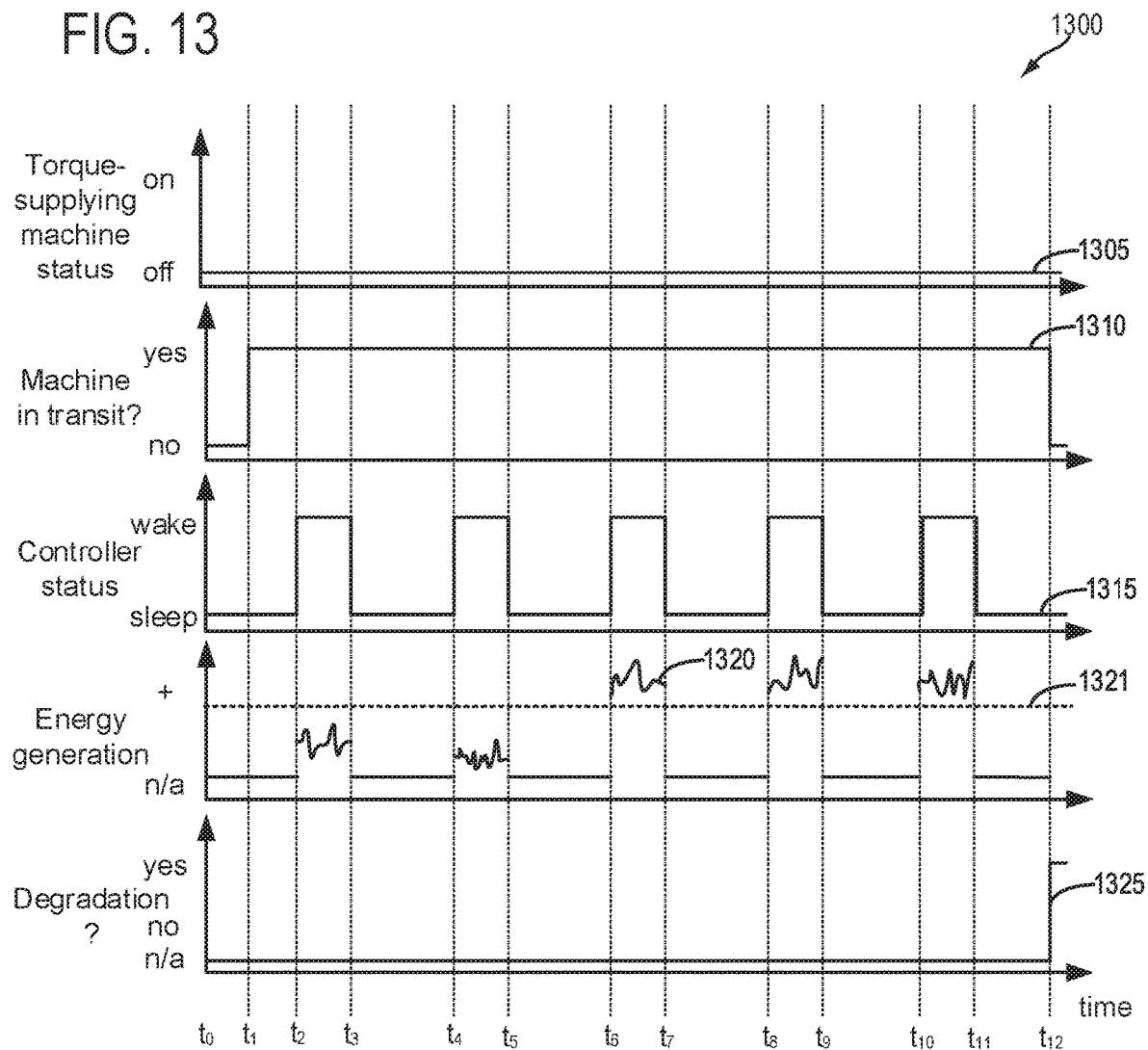
FIG. 13 depicts a prophetic example timeline for inferring potential degradation of a torque-supplying machine and/or mounts coupled to the torque-supplying machine, during shipping of the torque-supplying machine.

FIG. 11 depicts a prophetic example timeline for using energy harvesting methodology to infer potential degradation of an engine mount to which one or more energy harvesting module(s) are coupled, according to the method of FIG. 8. FIG. 12 depicts a prophetic example timeline for actively controlling a mode of an engine mount that has one or more energy harvesting modules coupled thereto, in response to a request for increased energy generation, according to the method of FIG. 9. FIG. 13 depicts a prophetic example timeline for inferring whether shipping of a torque-supplying machine may have resulted in degradation of one or more components of the torque-supplying machine and/or mounts to which the torque-supplying machine is coupled, according to the method of FIG. 10.

Turning now to FIG. 1, it schematically depicts an example vehicle system 100 as shown from a top view. Vehicle system 100 comprises a vehicle body 103 with a front end, labeled "FRONT", and a back end labeled "BACK." Vehicle system 100 may include a plurality of wheels 135. For example, as shown in FIG. 1, vehicle system 100 may include a first pair of wheels adjacent to the front end of the vehicle and a second pair of wheels adjacent the back end of the vehicle.

Vehicle system 100 may include an internal combustion engine, such as example engine 10, coupled to transmission 137. Engine 10 and transmission 137 may herein be referred to in combination as a vehicle powertrain 110 or a powertrain 110. It will be appreciated that other vehicle components coupled to one or more of engine and/or transmission 137 may also be included in the vehicle powertrain 110 without departing from the scope of the present invention. For example, engine 10 may include an engine intake 198 and an engine exhaust (not shown). Engine intake may include a throttle 197, for controlling an amount of intake air to engine 10. In some examples, throttle 197 may be controlled electronically via a controller, such as controller 12. In other examples, throttle 197 may be mechanically coupled to an accelerator pedal 181.

Vehicle system 100 is depicted as having a front wheel drive (FWD) transmission where engine 10 drives the front wheels via half shafts 109 and 111. In another embodiment, vehicle system 100 may have a rear wheel drive (RWD) transmission which drives the rear wheels via a driveshaft (not shown) and a differential (not shown) located on rear axle 131. In still other examples, vehicle system 100 may include a four wheel drive transmission.

Engine 10 and transmission 137 may be supported at least partially by frame, or chassis, 105, which in turn may be supported by plurality of wheels 135. As such, vibrations and movements from engine 10 and transmission 137 may be transmitted to frame 105. Frame 105 may also provide support to a body of vehicle system 100 and other internal components such that vibrations from engine operation may be transferred to an interior, or cabin, of vehicle system 100. In order to reduce transmission of vibrations to the interior, or cabin, of vehicle system 100, engine 10 and transmission 137 may be mechanically coupled via a plurality of members 139 to respective vibration mounts 133. Discussed herein, vibration mounts may refer to any type of mount that functions to dampen vibrations and movements. For example, solid rubber mounts, fluid-filled hydraulic mounts, etc. In some examples, vibration mounts 133 may be active mounts that may be capable of changing their dampening characteristics. For example, such an active mount may be controlled to be relatively soft at engine idle to absorb undesired vibration, but may be controlled to stiffen at higher engine speeds and loads to limit undesired engine motion. As one example, engine manifold vacuum (or other source of vacuum, such as a pump) may be selectively applied to an active vibration mount in order to change the characteristics of the active vibration mount. Such an example will be discussed in greater detail with regard to FIG. 4. However, it may be understood that such an example is meant to be illustrative, and is not meant to be limiting. Thus, active vibration mounts as discussed herein may include but are not limited to one or more of vacuum-regulated vibration mounts, active vibration mounts that counter vibration by commanding a counter shake to reduce intensity of vibration, magneto rheological mounts which may contain small particles of iron suspended in liquid such that when an electric current or magnetic field is applied to the fluid, the iron particles line up and effectively increase viscosity of the fluid, etc.

As depicted, engine 10 and transmission 137 are mechanically coupled at four locations to members 139 and via members 139 to four vibration mounts 133. In other alternate embodiments, a different number of members and vibration mounts may be used, without departing from the scope of the present disclosure.

Energy harvesting modules 151 may be coupled to vibration mounts 133 and/or members 139 at any number of appropriate positions where energy harvesting modules 151 may translate mechanical energy (e.g., pressure, vibration, strain, compression) to electrical energy. As one example, energy harvesting modules 151 may be a piezoelectric material. Piezoelectricity is a characteristic of certain materials to generate an electric potential when subjected to mechanical stress. Known piezoelectric materials include, but are not limited to, naturally occurring crystals, man-made crystals, and certain ceramics. More recently, piezoelectric fiber composite transducers have been developed that have certain advantages over bulk piezoelectric ceramics. For example, they are lighter, more flexible, and more robust. Higher piezoelectric voltage coefficients can be obtained from piezoelectric fiber composites thus resulting in more generated power. Furthermore, piezoelectric fiber composites can be created inexpensively to user-defined shapes. Thus, in some examples with regard to the present disclosure, energy harvesting modules 151 may include piezoelectric fiber composite transducers.

Energy harvesting modules 151 that include piezoelectric material may be one or more of quartz, topaz, tourmaline, berlinite ($AlPO_4$), gallium orthophosphate ($GaPO_4$), langasite ($La_3Ga_5SiO_{14}$), barium titanate ($BaTiO_3$), lead titanate ($PbTiO_3$), lead zirconate titanate (PZT), potassium niobate ($KNbO_3$), lithium niobate ($LiNbO_3$), lithium tantalite ($LiTaO_3$), sodium tungstate ($Na_2WO_4$), sodium potassium niobate (NaKNb), bismuth ferrite (BiFeO3), sodium niobate (NaNbO3), polyvinylidene fluoride (PVDF), zinc oxide (ZnO), cadmium sulfate (CdS), indium nitride (InN), etc.

Energy harvesting modules 151 may be communicatively (e.g., via electrical conductors such as wires) coupled to energy converters 153. Output from energy converters 153 may be communicatively coupled to energy storage device 196 (e.g., battery, capacitor, traction battery, etc.), such that a state of charge (SOC) of energy storage device 196 may be increased responsive to the generation of electrical energy via energy harvesting modules 151. Energy storage device 196 may provide power to a vehicle electrical system 152, for example. Furthermore, output from energy converters 153 may in some examples be directly provide power to vehicle electrical system 152. For example, energy harvested from energy harvesting modules 151 may be used to energize vehicle infotainment, air conditioning, electrical windows, USB chargers, among others. It may be understood that such energy harvesting may be particularly advantageous for hybrid electric vehicles as discussed herein, for use as an alternative source of energy. In some examples, energy converters 153 may convert alternating current (AC) to direct current (DC).

In some examples, a single energy harvesting module may be associated with a single vibration mount. In other examples, more than one energy harvesting module may be associated with a single vibration mount. The energy harvesting modules may be included anywhere with respect to the vibration mounts that will result in the generation of electricity due to mechanical stress of the material (e.g., piezoelectric material) associated with the energy harvesting modules. It may be understood that the energy harvesting modules may in some examples be bendable, or flexible, such that they may extend around curves or angles associated with a vibration mount.

View 150 depicts a view of vehicle system 100 as observed from the front end of vehicle system 100. Control system 15 including controller 12 may at least partially control engine 10 as well as vehicle system 100. The controller 12 receives signals from the various sensors 13 of FIG. 1 and employs the various actuators 81 of FIG. 1 to adjust engine operation based on the received signals and instructions stored on a memory of the controller. As an example, vehicle system 100 may include sensors dedicated to indicating the occupancy-state of the vehicle, for example seat load cells 189, door sensing technology 190, and/or onboard cameras 191.

Control system 15 and controller 12 may send control signals to actuators 81 which may include fuel injector 66 coupled to cylinder 30 in addition to other actuators of engine 10 and transmission 137 not depicted at FIG. 1. For illustrative purposes, only one cylinder 30 and one fuel injector 66 are shown. However, it may be understood that engine 10 may include a plurality of cylinders, and a plurality of fuel injectors. In some embodiments, each cylinder of engine 10 may include a spark plug 188 for initiating combustion. Control system 15 may provide an ignition spark to cylinder 30 via spark plug 188 in response to a spark advance signal from a controller, under select operating modes. However, in some embodiments, spark plug 188 may be omitted, such as where engine 10 may initiate combustion by auto-ignition or by injection of fuel as may be the case with some diesel engines.

Vehicle system 100 may include one or more fuel storage tanks 185 for storing fuel on-board the vehicle. For example, fuel tank 185 may store one or more liquid fuels, including but not limited to: gasoline, diesel, and alcohol fuels. In some examples, the fuel may be stored on-board the vehicle as a blend of two or more different fuels. For example, fuel tank 185 may be configured to store a blend of gasoline and ethanol (e.g., E10, E85, etc.) or a blend of gasoline and methanol (e.g., M10, M85, etc.), whereby these fuels or fuel blends may be delivered to engine 10. Still other suitable fuels or fuel blends may be supplied to engine 10, where they may be combusted at the engine to produce an engine output. The engine output may be utilized to propel the vehicle, for example.

In some embodiments, control system 15 may receive an indication of the level of fuel stored at fuel tank 185 via a fuel level sensor 187, also referred to herein as fuel level indicator (FLI) 187. The level of fuel stored at fuel tank 185 (e.g., as identified by the fuel level sensor 187) may be communicated to the vehicle operator, for example, via a fuel gauge or indication in a vehicle instrument panel (not shown).

Fuel tank 185 may be coupled to a fuel pump system 186. The fuel pump system 186 may include one or more pumps for pressurizing fuel delivered to the injectors of engine 10, such as the example injector 66 shown. As discussed, while only a single injector 66 is shown, additional injectors are provided for each cylinder. As depicted, fuel level sensor 187 may comprise a float connected to a variable resistor. Alternatively, other types of fuel level sensors may be used. Controller 12 may receive input data from the various sensors, process the input data, and trigger the actuators in response to the processed input data based on instruction or code programmed therein corresponding to one or more routines. In one example, engine 10 may be controlled at least partially by control system 15 including controller 12 and by input from a vehicle operator 180 or an autonomous controller, via an input device 181. In one example, input device 181 includes an accelerator pedal and a pedal position sensor 182 for generating a proportional pedal position signal PP. Similarly, control system 15 may receive an indication of an operator requested vehicle braking via a human operator 180, or an autonomous controller. For example, control system 15 may receive sensory feedback from pedal position sensor 157 which communicates with brake pedal 156. In some examples, vehicle system 100 may include an antilock brake system (ABS) 113. The ABS may include wheel speed sensors 114, for example. The ABS may further include at least two hydraulic valves (not shown) within the brake hydraulics (not shown). Controller 12 may monitor rotational speed of each wheel, and responsive to detection of a wheel rotating significantly slower than the others, the ABS 113 may be controlled to reduce hydraulic pressure to the brake 115 at the affected wheel, thus reducing the braking force on said wheel. Alternatively, responsive to detection of a wheel rotating significantly faster than the others, the ABS 113 may be controlled to increase hydraulic pressure to the brake at the affected wheel, thus increasing the braking force on said wheel. Herein, increasing brake pressure at one or more wheels via ABS 113 may be referred to as activating one or more wheel brakes.

One or more tire pressure monitoring sensors (TPMS) may be coupled to one or more tires of wheels in the vehicle. For example, FIG. 1 shows a tire pressure sensor 199 coupled to wheel 135 and configured to monitor a pressure in a tire 136 of wheel 135.

With regard to vehicle system 100, noise, vibration, and harshness (NVH) may arise during engine operation, transmission operation, during transitions in engine operating modes, etc. Additionally, NVH may arise as a result of driving over rough (e.g., uneven) surfaces, making sharp turns, abrupt deceleration and/or rapid acceleration, etc.

Vibration mounts 133 may be designed to dampen vehicle noise and vibrations across a broad range of frequencies, or alternatively may be designed to dampen specific ranges of vibrational frequencies. In this way, NVH arising from a number of different sources may each be dampened by a common vibration mount 133.

In some examples, engine 10 may be included in a hybrid electric vehicle (HEV) or plug-in HEV (PHEV), with multiple sources of torque available to one or more vehicle wheels 135. In the example shown, vehicle system 100 may include an electric machine 195. Electric machine 195 may be a motor or a motor/generator. While not explicitly illustrated, it may be understood that electric machine 195 may be a torque-supplying machine as discussed herein, and may be mounted to the frame via vibration mount(s) 133 in similar fashion as that discussed for engine 10 and transmission 137. Crankshaft 40 of engine 10 and electric machine 195 are connected via a transmission 137 to vehicle wheels 135 when one or more clutches 194 are engaged. In the depicted example, a first clutch is provided between crankshaft 40 and electric machine 195, and a second clutch is provided between electric machine 195 and transmission 137. Controller 12 may send a signal to an actuator of each clutch 194 to engage or disengage the clutch, so as to connect or disconnect crankshaft 40 from electric machine 195 and the components connected thereto, and/or connect or disconnect electric machine 195 from transmission 137 and the components connected thereto. Transmission 137 may be a gearbox, a planetary gear system, or another type of transmission. The powertrain may be configured in various manners including as a parallel, a series, or a series-parallel hybrid vehicle.

Electric machine 195 may receive electrical power from a traction battery 196 to provide torque to vehicle wheels 135. Electric machine 195 may also be operated as a generator to provide electrical power to charge energy storage device 196 (e.g., battery, or traction battery), for example during a braking operation.

Control system 15 may be communicatively coupled to other vehicles or infrastructures using appropriate communications technology, as is known in the art. For example, control system 15 may be coupled to other vehicles or infrastructures via a wireless network 183, which may comprise Wi-Fi, Bluetooth, a type of cellular service, a wireless data transfer protocol, and so on. Control system 15 may broadcast (and receive) information regarding vehicle data, vehicle diagnostics, traffic conditions, vehicle location information, vehicle operating procedures, etc., via vehicle-to-vehicle (V2V), vehicle-to-infrastructure-to-vehicle (V2I2V), and/or vehicle-to-infrastructure (V2I or V2X) technology. The communication and the information exchanged between vehicles and/or infrastructure can be either direct between vehicles, or can be multi-hop. In some examples, longer range communications (e.g. WiMax) may be used in place of, or in conjunction with, V2V, or V2I2V, to extend the coverage area by a few miles. In still other examples, vehicle control system 15 may be communicatively coupled to other vehicles or infrastructures via a wireless network 183 and the internet (e.g. cloud), as is commonly known in the art.

Vehicle system 100 may also include an on-board navigation system 215 (for example, a Global Positioning System) that an operator of the vehicle may interact with. The navigation system 215 may include one or more location sensors for assisting in estimating vehicle speed, vehicle altitude, vehicle position/location, etc. This information may be used to infer engine operating parameters, such as local barometric pressure. As discussed above, control system 15 may further be configured to receive information via the internet or other communication networks. Information received from the GPS may be cross-referenced to information available via the internet to determine local weather conditions, local vehicle regulations, etc. In some examples, vehicle system 100 may include lasers, radar, sonar, acoustic sensors (discussed in further detail below), which may enable vehicle location, traffic information, etc., to be collected via the vehicle.

Control system 15 may communicate with any number of other systems and components of the vehicle system. Turning now to FIG. 2, it depicts a block diagram of an example smart driving system 200 that may be used to operate vehicle system 100, described above at FIG. 1. Herein, the vehicle system 100 will be referred to simply as a "vehicle". The smart driving system 200 may in some examples be an autonomous driving system, however in other examples the smart driving system 200 may not be an autonomous driving system, without departing from the scope of this disclosure. Smart driving system 200, as shown, may include one or more of a user interface device 210, a navigation system 215, at least one driving sensor 220, and an autonomous mode controller 225 (where the smart driving system is an autonomous driving system). Smart driving system 200 is depicted as interacting (e.g., communicating) with control system 15.

The user interface device 210 may be configured to present information to vehicle occupants, under conditions wherein a vehicle occupant may be present. However, it may be understood that the vehicle may in some examples be operated autonomously in the absence of vehicle occupants, under certain conditions. The presented information may include audible information or visual information. Moreover, the user interface device 210 may be configured to receive user inputs. Thus, the user interface device 210 may be located in the passenger compartment (not shown) of the vehicle. In some possible approaches, the user interface device 210 may include a touch-sensitive display screen.

The navigation system 215 may be configured to determine a current location of the vehicle using, for example, a Global Positioning System (GPS) receiver configured to triangulate the position of the vehicle relative to satellites or terrestrial based transmitter towers. The navigation system 215 may be further configured to develop routes from the current location to a selected destination, as well as display a map and present driving directions to the selected destination via, for example, the user interface device 210. The navigation system may further be configured to be used in conjunction with route learning methodology, as will be discussed in further detail below.

The driving sensors 220 may include any number of devices configured to generate signals that help navigate the vehicle. Examples of driving sensors 220 may include a radar sensor, a lidar sensor, a vision sensor (e.g. a camera), vehicle to vehicle infrastructure networks, or the like. The driving sensors 220 may enable the vehicle to "see" the roadway and vehicle surroundings, and/or help to negotiate various obstacles (e.g., including but not limited to when the vehicle is operated in an autonomous mode). The driving sensors 220 may be configured to output sensor signals to, for example, controller 15 and/or autonomous mode controller 225 (where included).

The autonomous mode controller 225 (where included) may be configured to control one or more subsystems 230 while the vehicle is operating in the autonomous mode. Examples of subsystems 230 that may be controlled by the autonomous mode controller 225 may include a brake subsystem, a suspension subsystem, a steering subsystem, and a powertrain subsystem. The autonomous mode controller 225 may control any one or more of these subsystems 230 by outputting signals to control units associated with subsystems 230. In one example, the brake subsystem may comprise an anti-lock braking subsystem, configured to apply a braking force to one or more of wheels (e.g. 135). Discussed herein, applying the braking force to one or more of the vehicle wheels may be referred to as activating the brakes. To autonomously control the vehicle, the autonomous mode controller 225 may output appropriate commands to the subsystems 230. The commands may cause the subsystems to operate in accordance with the driving characteristics associated with the selected driving mode. For example, driving characteristics may include how aggressively the vehicle accelerates and decelerates, how much space the vehicle leaves behind a front vehicle, how frequently the vehicle changes lanes, etc.

Turning now to FIG. 3, an external view of an example vibration mount 300 is shown. It may be understood that vibration mount 300 may be the same as vibration mount 133 depicted at FIG. 1. With regard to FIG. 3, vibration mount 300 is discussed as an engine mount, but it may be understood that in other examples, vibration mount 300 may relate to a transmission mount, electric machine mount, traction battery mount, etc. Thus, it may be understood that such an example as depicted at FIG. 3 is meant to be illustrative, and is not meant to be limiting. When configured in a vehicle system that is on flat ground (e.g., vehicle system 100 at FIG. 1), engine mount 300 may be oriented in a substantially vertical direction. However, in other configurations, engine mount 300 may be oriented at an oblique angle relative to vertical. As used herein, however, the terms "upper" and "lower" may refer to respective ends of arrow 398, which indicates a directional axis specific to the engine mount. That is to say, arrow 398 provides reference for a relative positioning of components constituting engine mount 300, and not a reference for the orientation of engine mount 300 within a vehicle system. Additionally, an upper end of the engine mount may refer to the end closer toward the head of arrow 398 and a lower end of the engine mount may refer the end closer toward the tail of arrow 398.

Engine mount 300 includes an upper external housing 302 with a central opening 312 formed within a top surface thereof. Upper external housing 302 may be formed from a rigid material, such as a metal or hard plastic. Central opening 312 is configured to receive a fastener or bolt 306, which extends outwardly from a first elastomeric member or main rubber element (not shown, but see FIG. 4) for fastening to a component of the vehicle powertrain. Bolt 306 may be formed from a rigid material such as steel or aluminum.

An upper end of bolt 306 may be configured to rotate about the clearance of central opening 312, while the lower end (not shown) may be lodged in a first elastomeric member of the engine mount, and as such the lower end of the bolt may remain relatively stationary compared to the upper end of the bolt. In another example, bolt 306 may extend outwardly from a bearing member (not shown) that is partially encapsulated within the first elastomeric member of the housing, and may be configured to transfer vibrations to the first elastomeric member via the bearing member.

Bolt 306 may be coupled to a rigid upper bracket 339 via a fastener 340. It will be appreciated that upper bracket 339 may be similar to a member 139 described above with regard to FIG. 1. Upper bracket 339 may be formed from one of a metal or a hard plastic. A distal portion 338 of the upper bracket 339 may be coupled to a vehicle powertrain component (e.g., coupled to the powertrain component at a flange affixed thereto) via a fastener, in a manner generally known in the art.

Lower external housing 304 may be fastened (e.g., mechanically coupled) to upper housing 302. Lower housing 304 may be formed from a rigid material such as one of a metal or hard plastic. A coupling of the lower housing to a vehicle frame (e.g., frame 105 at FIG. 1) may be achieved via a plurality of lower brackets. In this way, the external housing may remain structurally rigid (e.g., substantially non-compressible), and any vibrations absorbed from the vehicle powertrain or vehicle frame may be transferred to the first elastomeric member within the external housing, said first elastomeric member configured to dampen the vibrations.

Shown in FIG. 3 are first lower bracket 332 and second lower bracket 334. It will be appreciated that still further brackets may be affixed to lower housing 304 in a similar manner to brackets 332 and 334 without departing from the scope of the invention. The lower brackets may be formed from metal, such as steel. However, other materials may be used to form the lower brackets without departing from the scope of the present invention. First lower bracket 332 is shown integrally formed with lower housing 304. A bolt (not shown) may couple (e.g., mechanically) lower bracket 332 to the vehicle frame via hole 382. Second lower bracket 334 is shown affixed to, but not integrally formed with, lower housing 304, and may similarly be coupled to the vehicle frame via hole 384.

Depicted at FIG. 3 are a few example locations where energy harvesting modules 151 may be included for translating mechanical energy to electrical energy. Energy harvesting modules 151 are depicted as shaded dashed boxes at FIG. 3. As one example, an energy harvesting module 151 may be coupled to upper external housing 302 and a portion of upper bracket 339, as illustrated by arrow 371. For example, there may be relative movement of upper bracket 339 with respect to upper external housing 302, which may cause mechanical stress in an energy harvesting module mechanically coupled to both the upper bracket 339 and the upper external housing 302. As another example, an energy harvesting module 151 may be coupled to upper external housing 302 and lower housing 304, as represented by arrow 372. For example, there may be relative movement of upper external housing 302 with respect to lower housing 304, which may cause mechanical stress in an energy harvesting module mechanically coupled to both the upper external housing 302 and the lower housing 304. As another example, an energy harvesting module 151 may be coupled to lower external housing 304 and second lower bracket 334, as represented by arrow 373. As yet another example, an energy harvesting module 151 may be coupled to second lower bracket 334 as represented by arrow 374. In another example, an energy harvesting module 151 may be coupled to second lower bracket 334 as represented by arrow 375. Other examples are within the scope of this disclosure, and it may be understood that energy harvesting module(s) may be included at any position with regard to engine mount 300 such that induced mechanical stress in the energy harvesting module(s) resulting from, for example, engine operation, transmission operation, electric machine operation, driving conditions, etc., may be converted to electrical energy as discussed above. It may be further understood that any number of energy harvesting modules may be coupled to the engine mount for extracting a desired amount of energy from the mount.

Turning now to FIG. 4 depicted is a cross-sectional view 400 of an active engine mount (e.g., engine mount 133 at FIG. 1 or engine mount 300 at FIG. 3). While FIG. 4 is discussed with regard to an engine mount, it may be understood that in other examples the mount may be a transmission mount, electric machine mount, battery mount, etc., without departing from the scope of this disclosure. Thus, it may be understood that the active engine mount depicted at FIG. 4 is meant to be illustrative, and is not meant to be limiting. As used herein, the terms "upper" and "lower" may refer to respective ends of arrow 398. It will be appreciated that arrow 398 may provide a reference for the relative positioning of components within the active engine mount.

The active engine mount assembly may include an external housing 402 (e.g., similar to 302 at FIG. 3) dimensioned to receive a first elastomeric member or main rubber element 404 that is generally shaped as a truncated cone, and primarily made of an elastomeric material, such as an elastic rubber as is conventional in the art. A bolt 406 (e.g., similar to 306 at FIG. 3) extends outwardly from the first elastomeric member for fastening to the powertrain or engine (not shown, but see FIG. 3) in a manner generally known in the art. In the depicted example, bolt 406 is included with a metal bearing member 408 of which at least a lower portion is encapsulated within the first elastomeric member 404. In addition, a lower peripheral portion of the first elastomeric member may include a stiffener, such as metallic stiffener 410, molded within the first elastomeric member to add rigidity and support. In this way, vibrations and/or displacements from the powertrain may be transferred to the first elastomeric member 404 of the active engine mount.

As discussed above with regard to FIG. 3, the first elastomeric member is received within the upper external housing 402 so that the bolt 406 extends through a central opening 412 in the restrictor. The lower surface 405 of the first elastomeric member 404 forms a portion of a first or upper fluid chamber 416, namely a high pressure side, of the engine mount. First fluid chamber 416 may be filled with a hydraulic fluid (e.g., glycol). The remainder of the first fluid chamber 416 is defined by the inertia track assembly 420. It may be understood that inertia track assembly 420 may herein also be referred to as a partitioning structure. An outer portion of an upper surface of the partitioning structure (denoted by reference numeral 422) abuttingly and sealingly engages the first elastomeric member 404 in order to seal the first fluid chamber 416. A second outer portion of the partitioning structure along the lower surface denoted by reference numeral 424 is sealingly engaged by a second elastomeric member 430 (a rubber boot or diaphragm) and particularly an upper peripheral portion 432 thereof. Lower surface 424 of the partitioning structure 420, in combination with second elastomeric member 430, form a second or lower fluid chamber 450. Second fluid chamber 450 may too be filled with a hydraulic fluid (e.g., glycol). The second elastomeric member 430 is protected by a diaphragm cover 434, preferably formed of a more rigid material than the elastomeric diaphragm, and that matingly engages (e.g., mechanically couples to) the lower external housing 440. When the lower housing 440 is fastened to the upper housing, the lower peripheral edge of the first elastomeric member 404 and the peripheral portion 432 of the second elastomeric member sealingly engage opposite sides or faces 422, 424, respectively, of the partitioning structure 420.

The partitioning structure and operation of engine mount 400 will be briefly described. As indicated, the first fluid chamber 416 and the second fluid chamber 450 are fluidly coupled together by partitioning structure 420. Partitioning structure 420 comprises a channel plate 401, a decoupler 460 (e.g., compliant membrane), a first fluid track 470 (e.g., idle track), a second fluid track 475 (e.g. ride track), and a vacuum chamber 465. Vacuum chamber 465 may be coupled to the partitioning structure such that the vacuum chamber may be defined by passageways in the channel plate 401, and wherein a segment of the vacuum chamber is defined by decoupler 460. Vacuum chamber 465 may be fluidly connected to a source of either vacuum, or atmospheric pressure, via conduit 480. Vacuum may be provided by any available source of vehicle vacuum, for example intake manifold vacuum. In one example, a first pressure 447 (e.g. atmospheric pressure), or a second pressure 448 (e.g. vacuum) may be applied to vacuum chamber 365, via controlling two way valve 446. For example, controller 12 may command two way valve 446 to enable the first pressure, or the second pressure, to be communicated to vacuum chamber 465, depending on vehicle operating conditions, as will be discussed in further detail below. More specifically, controller 12 may send a signal to two-way valve 446 to actuate the valve to either couple first pressure 447 to vacuum chamber 465, or to couple second pressure 448 to vacuum chamber 465.

When vacuum chamber 465 is at atmospheric pressure (e.g., a first pressure), decoupler 460 may be free to move. Furthermore, when vacuum chamber 465 is at atmospheric pressure, a first vacuum-actuated valve 455 is seated in an upper position within channel plate 401 such that the first fluid track 470 is closed. When in such a configuration, the decoupler 460 may breathe in response to vibrations or displacements, and fluid flow between first fluid chamber 416 and second fluid chamber 450 may only be allowed via the second fluid track 475. As such, engine mount 400 typifies decoupled engine mount function when vacuum chamber 465 is at atmospheric pressure. Such a configuration of active engine mount 400 may be termed a second, or stiffening mode of active engine mount operation.

Alternatively, application of vacuum to vacuum chamber 465 may serve to seat decoupler 460 against channel plate 401, indicated by arrow 486, and furthermore may position first vacuum-actuated valve in a lower position, indicated by arrow 485. As such, first fluid track 470 is opened, and decoupler 360 is not permitted to move, or breathe. Accordingly, fluid flow between first fluid chamber 416 and second fluid chamber 450 occurs via the first fluid track 470, as first fluid track 470 represents the path of least resistance through the inertia track assembly 420, thus providing a soft engine mount for idle mode operation. In other words, with vacuum chamber 465 coupled to second pressure 448 (e.g. vacuum), active engine mount 400 may be understood to be operating in a first, or dampening mode of active engine mount operation.

Depicted at FIG. 4 is another example location where an energy harvesting module 151 may be positioned respective to the engine mount, for harvesting energy from mechanical stress applied to the module, as represented by arrow 471. While not explicitly illustrated, it may be understood that in some examples, an energy harvesting module may be incorporated into the inertia track assembly 420. In such an example, it may be possible to control a state or mode of the engine mount by providing electricity to the energy harvesting module, such that a change in its shape results in the mode change.

Thus, discussed herein, a system may comprise a torque-supplying machine secured to a frame via one or more vibration mounts, the one or more vibration mounts including one or more mechano-electric conversion modules. Such a system may further include a controller with computer readable instructions stored on non-transitory memory. When executed, the instructions may cause the controller to determine an actual amount of energy generated via the one or more mechano-electric conversion modules during a predetermined timeframe. The instructions may further cause the controller to compare the amount of energy generated to an expected amount of energy predicted to be generated during the same predetermined timeframe. The instructions may further cause the controller to indicate degradation of the torque-supplying machine and/or the one or more vibration mounts responsive to the actual amount of energy generated during the predetermined timeframe differing from the expected amount of energy predicted to be generated during the same predetermined timeframe by more than a threshold difference. The instructions may further cause the controller to request mitigating action responsive to degradation of the torque-supplying machine and/or the one or more vibration mounts being indicated.

For such a system, the one or more mechano-electric conversion modules may be comprised of one or more of polyvinylidene fluoride, zinc oxide, cadmium sulfate, indium nitride, sodium niobate, lead zirconate titanate, barium titanate, and lithium niobate.

For such a system, the system may further include a vehicle, where the torque-supplying machine is one of an engine, a transmission, and an electric machine and the frame is a chassis of the vehicle. The system may further include an onboard navigation system included as part of the vehicle, and one or more driving sensors of the vehicle. The controller may be a vehicle controller that stores further instructions to learn a set of driving routes commonly traveled by the vehicle based on information acquired by the controller in conjunction with the onboard navigation system and the one or more driving sensors. In such an example, the predetermined timeframe may correspond to a single driving route of the set of driving routes. Furthermore, the controller may store further instructions to learn the expected amount of energy predicted to be generated for each of the single driving routes.

In such a system, the predetermined timeframe may correspond to a shipping of the torque-supplying machine from a first starting location to a second ending destination.

As discussed above, an energy harvesting module that is generating electricity may be viewed as advantageous, particularly in the case of a hybrid vehicle. However, it is herein recognized that there may be circumstances where electricity generation is due to a vibration mount to which the energy harvesting module is coupled being degraded (resulting in greater engine displacement, for example, and thereby greater electricity generation). Thus, it may be possible to set an energy generation threshold where, responsive to energy generation being greater than the energy generation threshold, an indication of vibration mount degradation is concluded. However, such a threshold may have to be set undesirably high, to avoid false positives stemming from a wide variety of driving conditions, driver behaviors, etc. Such a high threshold may be undesirable in that by the time vibration mount degradation is detected or determined, the issue of vibration mount degradation may already have had undesirable consequences on other aspects of vehicle operation (e.g., exhaust system degradation due to engine mount degradation, negative impacts to fuel economy, etc.). A smarter methodology may enable determination of vibration mount degradation at earlier stages in the course of the degradation process, which may increase opportunity for taking mitigating action prior to the vibration mount degradation having additional deleterious effects.

Accordingly, turning now to FIG. 5, a high level example method 500 is depicted for learning commonly traveled driving routines, and additionally learning expected amounts of energy generation from one or more energy harvesting modules (e.g., energy harvesting modules 151 at FIG. 1) corresponding to the learned driving routines. As will be discussed in further detail below, such learning may enable actual energy generation for particular driving routines to be compared to expected energy generation. Vibration mount degradation may then be inferred based on whether the actual energy generation differs from the expected energy generation by more than a predetermined threshold, for example. In this way, vibration mount degradation may be inferred earlier on in the vibration mount degradation process, such that appropriate mitigating action may be taken to avoid additional vehicle system degradation stemming from the vibration mount degradation.

Method 500 will be described with reference to the systems described herein and shown in FIGS. 1-4, though it should be understood that similar methods may be applied to other systems without departing from the scope of this disclosure. Method 500 may be carried out by a controller, such as controller 12 in FIG. 1, and may be stored at the controller as executable instructions in non-transitory memory. Instructions for carrying out method 500 and the rest of the methods included herein may be executed by the controller based on instructions stored on a memory of the controller and in conjunction with signals received from sensors of the vehicle system, such as the sensors described above with reference to FIGS. 1-2. The controller may employ vehicle system actuators such as fuel injector(s) (e.g., fuel injector 66 at FIG. 1), two-way valve (e.g., two-way valve 446 at FIG. 4), etc., to alter states of devices in the physical world according to the methods depicted below.

Method 500 begins at 505 and includes indicating whether a vehicle startup is requested. A vehicle startup request may include a key-on event, a remote start event, a driver depressing an ignition button on the vehicle dash, etc. A vehicle startup event may include the vehicle being started with engine operation, electric-only operation, or some combination of the two. If a vehicle startup is not indicated, then method 500 may proceed to 510 where current vehicle operating parameters may be maintained. For example, current operating conditions pertaining to the engine, electric machine, etc., may be maintained. Method 500 may then end.

Returning to 505, in response to a vehicle startup event being indicated, method 500 proceeds to 515. At 515, method 500 includes accessing vehicle location, driver information, day of the week (DOW), time of day (TOD), etc. A driver's identity may be input by the driver, or inferred based on driving habits, seat position, cabin climate control preferences, voice activated commands, etc. Vehicle location may be accessed via an onboard navigation system, for example via GPS, or other means such as via wireless communication with the internet.

Continuing to 520, method 500 includes indicating whether conditions are met for energy harvesting learning. Specifically, at 520, method 500 queries whether conditions are met for learning an amount of energy generated from one or more energy harvesting modules coupled to one or more vibration mounts, over the course of a drive cycle, where the learning may additionally include learning the driving routine as well. Conditions being met at 520 may include an indication that the controller is requesting energy harvesting learning. Additionally or alternatively, conditions being indicated to be met at 520 may include an indication that there is an inferred absence of degradation associated with the vibration mounts to which energy harvesting modules are coupled. For example, as will be discussed in greater detail with regard to FIG. 10, in some examples vibration mounts may be monitored for degradation during shipping of a vehicle (with the torque-supplying machine included) or a torque-supplying machine and associated mounts (e.g., mounting structure(s)), prior to the vehicle/torque-supplying machine being used. In such an example, conditions being met for energy harvesting learning may include an indication that the vibration mounts are not degraded to any appreciable extent as a result of the shipping process. Additionally or alternatively, conditions being indicated to be met at 520 may include an indication that there is an absence of inferred degradation related to one or more of a suspension system of the vehicle, tires of the vehicle, wheel alignment, or any other aspect of vehicle operation which may degrade learning associated with energy harvesting modules coupled to vibration mounts. Additionally or alternatively, conditions being indicated to be met at 520 may include an indication that energy harvesting learning is requested for a particular driver identified at step 515.

If, at 520, conditions are not indicated to be met for energy harvesting learning, method 500 may proceed to 510 where the drive cycle may proceed without energy harvesting learning taking place. Method 500 may then end.

Returning to 520, responsive to conditions being met for energy harvesting learning, method 500 proceeds to 525. At 525, method 500 includes recording vehicle route information, along with energy harvesting data acquired by the controller along the particular route being traveled via the vehicle. For example, the vehicle controller may continuously or regularly collect data from various sensor systems and outside sources regarding the vehicle's operations/conditions, location, traffic information, local weather information, etc. The data may be collected by, for example, the onboard navigation system, driving sensors (e.g., driving sensors 220 at FIG. 2), etc. Other feedback signals, such as input from sensors typical of vehicles, may also be read from the vehicle during the drive cycle. Example sensors may include tire pressure monitoring sensor(s), engine temperature sensor(s), brake heat sensor(s), brake pad status sensor(s), tire tread sensor(s), fuel sensor(s), oil level and quality sensor(s), air quality sensor(s), etc. The controller may in some examples retrieve various types of non-real-time data, for example information from a detailed map, which may be stored at the controller or which may be retrieved wirelessly.

Along the drive cycle, the controller may retrieve information related to amount of energy (e.g., current amount, voltage amount, power amount) generated by each of the energy harvesting module(s) included in the vehicle. It may be understood that the amount of energy generated from each of the energy harvesting modules may be stored at the controller as a lookup table that includes elapsed time and/or distance corresponding to the drive cycle so that energy generation may be correlated with particular aspects or segments of the drive cycle, as will be elaborated in further detail below.

Data pertaining to particular driving routes may be stored at the controller as a plurality of trip vectors (e.g., direction of travel and magnitude of distance traveled), for example. Similarly, data pertaining to energy generation may be stored at the controller as energy generation vectors (e.g., energy generation magnitude corresponding to different energy harvesting modules). Accordingly, proceeding to 530, method 500 includes processing the acquired data for a driving cycle or a plurality of driving cycles to learn commonly traveled routes and expected energy generation from energy harvesting module(s) included in the vehicle as a function of the learned routes. In some examples data collected from the vehicle travel routines including GPS data and energy harvesting data may be applied to an algorithm that feeds into one or more machine learning algorithms to determine common vehicle travel routes and associated energy generation from one or more energy harvesting modules corresponding to the travel routes. Such an example is meant to be illustrative, and is not meant to be limiting. For example, any commonly used methodology for vehicle route learning may be utilized via the vehicle controller in order to establish learned travel routes and energy harvesting generation corresponding to the learned travel routes without departing from the scope of this disclosure.

Proceeding to 535, method 500 includes segmenting individual driving routines based on information obtained along the driving routines corresponding to vehicle operational parameters, and corresponding energy generation from the energy harvesting module(s). For example, as will be elaborated in further detail below, it may be desirable to correlate energy generation amounts for a particular driving routine with segments associated with a substantial amount of acceleration/deceleration (e.g., stop and go traffic), city driving vs highway driving, rough road terrain (e.g., roads with a plurality of speedbumps) compared to smoother road terrain, road curvature(s) as compared to straighter roads, different road grades, etc. For example, the amount of energy generated may be different for a rough road as compared to a smooth road. As another example, the amount of energy generated may be different for a segment of road that includes rapid and repeated acceleration/deceleration requests, as compared to segments of highway driving with little changes in acceleration/deceleration requests. As yet another example, the amount of energy generated even for a same road segment may differ depending on the driver. For example, an aggressive driver may travel at a greater speed through an area associated with a plurality of speed bumps, whereas a less aggressive driver may travel at a significantly slower speed. In such an example, energy generation may be greater for the aggressive driver, due to greater engine displacement.

Furthermore, in the case where energy harvesting module(s) are coupled to an active vibration mount, such as the active vibration mount depicted at FIG. 4, segmenting the individual driving routines may further include, for each segment, classifying information pertaining to what mode of operation (e.g., dampening mode as compared to stiffening mode) the active vibration mount is commanded for each segment of the learned driving routine. Such information may be useful in determining whether a particular vibration mount is stuck in one mode or another, as will be discussed in greater detail below.

Proceeding to 540, method 500 includes storing the data discussed above obtained at steps 525-535 as lookup tables at the controller.

In some examples, an amount of energy generation for a particular learned drive cycle may be considered "learned" in response to the drive cycle being traveled a predetermined number of times. For example, after a vehicle has traveled a particular routine at least 3 times, or at least 5 times, or at least 10 times, or at least 15 times, or at least 20 times, etc., the amounts of energy generation obtained for each drive cycle may be averaged together to constitute the learned or expected amount of energy generation. In some examples, the learned or expected amount of energy generation may be established provided that an error or a range associated with the average is less than a predetermined threshold error or a predetermined threshold range.

Turning to FIG. 6A, depicted is an example lookup table 600 that depicts a number of different learned drive cycles (A-H), with corresponding expected total amounts of energy generated by a first energy harvesting module and a second energy harvesting module during the course of the particular drive cycle. It may be understood that the expected total amounts of energy generated by the first energy harvesting module and the second energy harvesting module may represent an average of any number of times the particular drive route has been traveled by the vehicle. It may be further understood that lookup table 600 may represent a lookup table specific to a particular driver, while a similar lookup table for a different driver may be populated with different expected amounts of energy generation.

Turning now to FIG. 6B, another example lookup table 650 is shown, where drive cycle D (from lookup table 600 depicted at FIG. 6A) is segmented into different categories or operational conditions corresponding to the drive cycle. Specifically, drive cycle D is segmented into four different segments. Segment 1 corresponds to city driving, segment 2 corresponds to non-congested highway driving, segment 3 corresponds to congested highway driving (e.g., stop and go traffic), and segment 4 corresponds to a bumpy road with a plurality of speed bumps, for example. Thus, briefly, drive cycle D may in some examples be a drive cycle where the vehicle is parked in the city and a vehicle operator starts the vehicle to leave a place of employment. Accordingly, the first segment involves city driving. The operator navigates the vehicle through the city to a highway, where the second segment involves non-congested highway driving until the highway driving becomes congested for the third segment. The operator may then proceed to exit the highway and travel during the fourth segment through a neighborhood that involves a plurality of speedbumps in order to arrive at a place of residence.

Thus, depicted at FIG. 6B is the amount of energy generated per segment for energy harvesting module 1 along drive cycle D. Specifically, at FIG. 6A the total amount of energy expected for drive cycle D is 100 mA of current. Accordingly, summing the different segments of drive cycle D at FIG. 6B equals 100 mA of current.

FIG. 6B further depicts commanded vibration mount mode. It may be understood that such information may be included in the lookup table when the vibration mount is an active vibration mount, such as the active vibration mount of FIG. 4. Specifically, segment 1 corresponds to the active vibration mount being commanded to a dampening mode of operation. Segment 2 corresponds to the active vibration mount being commanded to a stiffening mode of operation.

Segments 3 and 4 both correspond to the active vibration mount being commanded to the dampening mode of operation. Such lookup tables as that depicted at FIGS. 6A-6B may be relied upon for inferring potential degradation of vibration mount(s) and/or other components (e.g., engine, transmission, electric machine) of the vehicle system.

Figure 7:
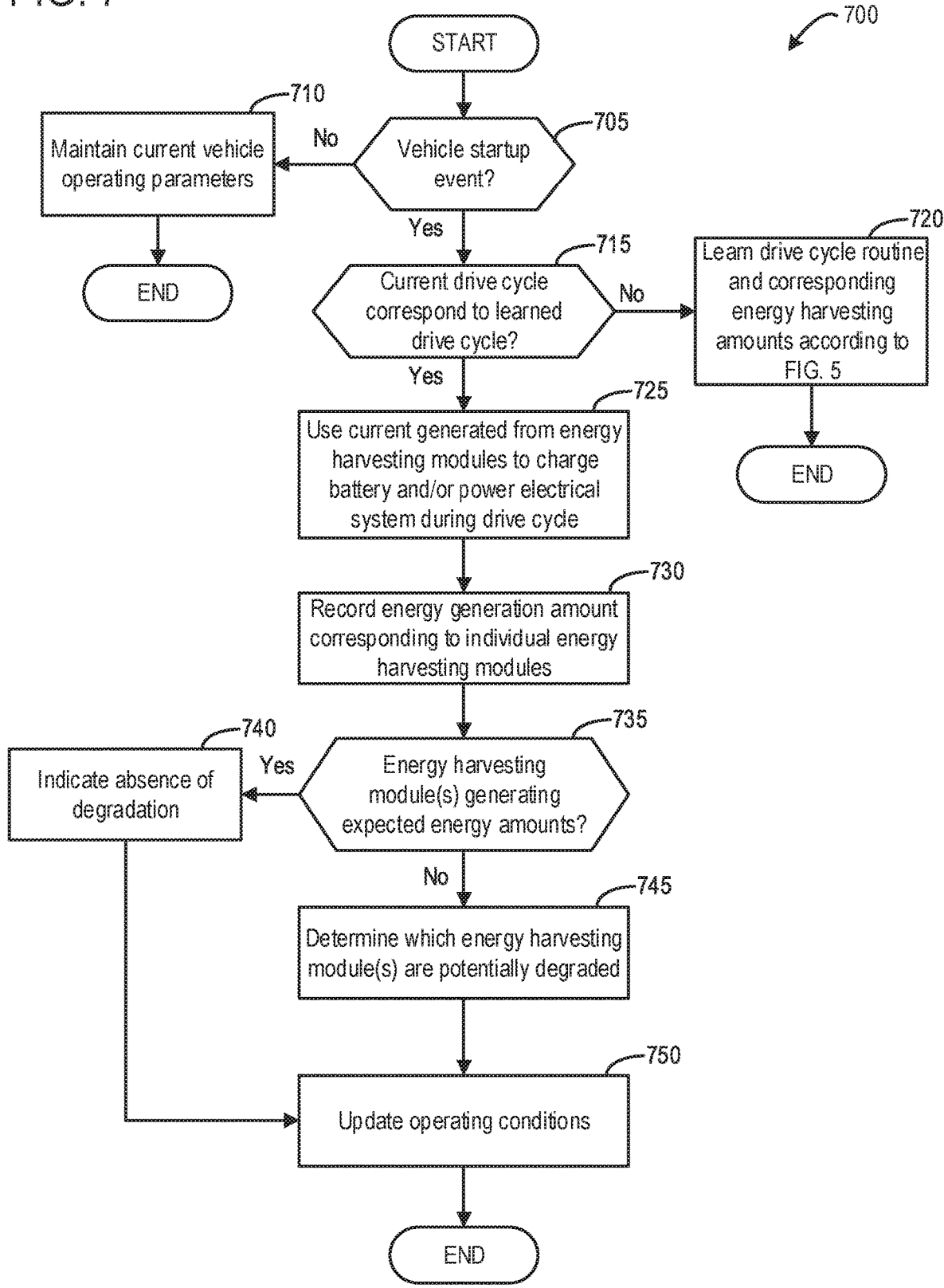
FIG. 7 depicts a high-level example method for determining whether a particular vibration mount is degraded, based on energy generated from an associated energy harvesting module.

Accordingly, turning now to FIG. 7, a high level example method 700 for inferring potential degradation of a vibration mount or vibration mounts is shown. Specifically, method 700 includes monitoring energy generation from an energy harvesting module coupled to a vibration mount during a drive cycle. The method includes comparing actual energy generation to an expected amount of energy generation for the particular drive cycle, where the expected amount of energy generation is based on energy generation from the energy harvesting module for the particular drive cycle learned over time as discussed above with regard to FIG. 5. Method 700 is discussed with regard to an engine mount, however it may be understood that similar methodology may be used with regard to other vibration mounts for torque-supplying machines (e.g., transmission, electric machine), and may even be extended to mounts for devices such as the traction battery (e.g., traction battery 196 at FIG. 1).

Method 700 will be described with reference to the systems described herein and shown in FIGS. 1-4, though it should be understood that similar methods may be applied to other systems without departing from the scope of this disclosure. Method 700 may be carried out by a controller, such as controller 12 in FIG. 1, and may be stored at the controller as executable instructions in non-transitory memory. Instructions for carrying out method 700 and the rest of the methods included herein may be executed by the controller based on instructions stored on a memory of the controller and in conjunction with signals received from sensors of the engine system, such as the sensors described above with reference to FIGS. 1-2. The controller may employ engine system actuators such as fuel injector(s) (e.g., fuel injector 66 at FIG. 1), two-way valve (e.g., two-way valve 446 at FIG. 4), etc., to alter states of devices in the physical world according to the methods depicted below.

Method 700 begins at 705, and includes indicating whether a vehicle startup is requested. A vehicle startup event may include a remote start event (initiated for example via a key fob, smart device, etc.), an operator turning a key in an ignition at the dash, an operator pressing an ignition button at the vehicle dash, etc. If a vehicle startup event is not indicated, method 700 proceeds to 710. At 710, method 700 includes maintaining current vehicle operating parameters. For example, if the vehicle is in operation, current operational parameters may be maintained. If the vehicle is not in operation, then the vehicle may be maintained deactivated. Method 700 may then end. Returning to 705, responsive to a vehicle startup being requested, method 700 proceeds to 715. At 715, method 700 includes indicating whether the current drive cycle corresponds to a learned drive cycle or in other words, a learned route. Specifically, the controller of the vehicle may retrieve information including but not limited to vehicle location, driver information, day of week, time of day, etc. In some examples, a vehicle operator may input or select a particular drive cycle via the onboard navigation system, such that the controller may know the particular drive route. In other examples, the controller may infer a current driving routine based on one or more of the driver information, vehicle location as it proceeds along the driving route, day of week, time of day, etc. The controller may query stored driving routes (e.g., stored at lookup tables at the controller, or at a remote server), to assess whether the current drive cycle corresponds to a previously learned drive cycle. If the current drive cycle does not correspond to a learned route, then method 700 proceeds to 720. At 720, method 700 may include recording data along the drive cycle related to driving route, amount of energy harvested from the one or more energy harvesting modules, traffic conditions, engine mount modes as a function of driving routine (where the engine mount(s) are active engine mounts), and other relevant parameters. In other words, at 720, method 700 includes using the method of FIG. 5 to learn the driving route and corresponding energy harvesting amounts along the route. Method 700 may then end.

Returning to 715, in a situation where the current driving route corresponds to a previously learned route, method 700 proceeds to 725. At 725, method 700 includes using current generated from the energy harvesting module(s) to either charge the onboard energy storage device and/or to power one or more aspects of the vehicle electrical system. The controller may allocate current to the battery and/or auxiliary components as a function of one or more of battery SOC, driver demand, energy demand of auxiliary electrical components, etc.

Proceeding to 730, method 700 includes recording energy generated from each of the one or more energy harvesting modules during the course of the drive cycle. For example, based on amounts of current (or as a function of voltage or power) allocated to charge the onboard energy storage device and/or utilized to power auxiliary electrical components, the controller may infer the amount of energy generated from the one or more energy harvesting modules. In some examples, the controller may integrate energy generated by an energy harvesting module over time to arrive at a total amount of energy generated by a particular energy harvesting module. In some examples, the controller may rely on a voltmeter, or an ammeter or ohmmeter configured to determine energy generation from the energy harvesting modules, for inferring the amount of energy generated from the one or more energy harvesting modules.

Proceeding to 735, method 700 includes indicating whether the energy harvesting module(s) are generating expected energy amounts. In other words, the controller may determine whether actual energy generation for each energy harvesting module differs from a corresponding expected amount by more than a predetermined threshold. The predetermined threshold may simply be a predetermined amount greater than the expected amount. In some examples, the predetermined threshold may vary as a function of the expected amount. For example, the predetermined threshold may be closer to the expected amount when the expected amount of energy generation is smaller, and may be further from the expected amount when the expected amount of energy generation is greater (to account for noise variation due to driving conditions). While not explicitly illustrated, in some examples step 735 may be carried out while the vehicle is proceeding along its current route. However, in other examples, step 735 may be conducted responsive to the current drive cycle being completed. For example, step 735 may in some examples be conducted in response to the vehicle being deactivated when a desired destination has been reached. In still other examples, method 735 may be carried out in a combination of during the current drive cycle and upon completion of the drive cycle.

If, at 735, it is inferred that the energy harvesting module(s) are generating energy within the predetermined threshold of the expected amount of energy, then method 700 proceeds to 740. At 740, method 700 includes indicating an absence of degradation of the engine mount(s) to which the energy harvesting module(s) are coupled. The result may be stored at the controller.

Proceeding to 750, method 700 includes updating vehicle operating conditions. For example, the controller may not place any restrictions on engine use or take any mitigating action due to the fact that an absence of degradation was inferred. Method 700 may then end.

Returning to 735, in response to one or more energy harvesting module(s) being determined to not be generating the expected amount of energy, method 700 proceeds to 745. At 745, method 700 includes determining which energy harvesting module is potentially degraded. Specifically, in the case of a plurality of energy harvesting module(s), the controller may flag one or more of the plurality of energy harvesting module(s) as potentially degraded. The result may be stored at the controller. In some examples, a confidence parameter may be applied to an indication of potential degradation. For example, there may be a high confidence associated with a possibility that a particular engine mount is degraded, a medium confidence, or a low confidence. In other examples, there may be more than just three confidence parameters (e.g., the confidence parameters may be based on a system from 1-10, where highest confidence is 10, and lowest confidence is 1). In other examples, the confidence parameters may be simply "high confidence" or "low confidence". Other possibilities are within the scope of this disclosure.

In one example, the confidence parameter may be assigned based on a degree to which the actual energy generated differs from the expected amount of energy generated. For example, the greater the difference, the higher the confidence parameter. Additionally or alternatively, the confidence parameter may be assigned as a function of other vehicle operational conditions monitored during the drive cycle. For example, the controller may retrieve information related to tire pressure (e.g., via tire pressure monitoring sensor(s) 199 at FIG. 1) over the course of the drive cycle. Aberrant tire pressure may impact an amount of engine movement (and thereby amount of energy generated) over the course of a drive cycle, for example. Thus, in a case where the controller infers that one or more tires are of a pressure that differs from an expected pressure by more than a tire pressure threshold, then the energy harvesting module(s) may be generating energy that differs from the expected energy due to the undesired tire pressure. In such an example, the confidence parameter assigned to the potential energy harvesting module degradation may be lower than in a case where a measured tire pressure more closely correlates with expected tire pressure.

Additionally or alternatively, the confidence parameter may be based on other operational parameters. For example, if the controller infers that there is a wheel alignment issue, then the reason for the unexpected energy generation may be due, at least in part, to the issue with wheel alignment. In such an example, the confidence parameter may be lower in a case where the controller infers an issue with wheel alignment.

Additionally or alternatively, the confidence parameter may be based on an indication of degraded braking. For example, the controller may assess whether unexpected energy generation is specifically correlated with braking maneuvers. Such a correlation may indicate that there is an issue with the brakes (e.g., degraded brake rotors), that may be resulting in undesirable engine movement thereby resulting in the unexpected energy generation. In such an example, the confidence parameter may be lower in a case where the controller infers degraded braking. Additionally or alternatively, the confidence parameter may be based on any inferred changes to the driving routine. For example, if a particular driving routine is associated with low congestion freeway driving, but for the current drive cycle the freeway driving is highly congested (e.g., due to an accident) thereby resulting in substantial stop-and-go driving as opposed to an absence of stop-and-go driving, then the confidence parameter may be adjusted accordingly. For example, the confidence parameter may be lower when the controller infers a difference in driving conditions for a particular drive cycle. The controller may infer such differences based on data acquired via the driving sensor(s) (e.g., driving sensor(s) 220 at FIG. 2), information retrieved via V2V and/or V212V communications, information retrieved from relevant internet sites (e.g., traffic server), etc.

Proceeding to 750, method 700 includes updating vehicle operating parameters. Updating vehicle operating parameters at 750 responsive to an indication of potential engine mount degradation may include storing the result and associated confidence parameter at the controller. In some examples, based on the confidence parameter, the controller may illuminate a malfunction indicator (MIL) at the vehicle dash. For example, if potential degradation is associated with a high confidence parameter, then the MIL may be illuminated to alert the vehicle operator of a request to service the vehicle. Alternatively, potential degradation associated with a low confidence parameter may be stored at the controller, and a MIL may or may not be illuminated. The confidence parameters may assist technicians in addressing issues when the vehicle is serviced.

In some examples, updating operating conditions at 750 may include updating instructions at the controller to rely on electric-only vehicle operation as frequently as possible due to an indication of degraded engine mount(s). For example, responsive to an indication of potential engine mount degradation that is associated with a high confidence parameter, the controller may command the vehicle to be operated as frequently as possible in electric-only mode to avoid undesirable downstream effects (e.g., exhaust system degradation) of operating the engine with one or more degraded engine mounts.

Additionally or alternatively, updating operating conditions at 750 may include the controller suggesting alternative routes to the vehicle operator that may reduce an amount of engine displacement for particular driving routines. For example, in conjunction with the onboard navigation system, the controller may recommend avoiding areas of high congestion, bumpy roads, areas with significant altitude changes, etc. In other words, the controller may suggest modified routes given the indication of potential engine mount degradation. The vehicle operator may choose to elect traveling along the alternative routes, or in the case where the vehicle is autonomously controlled, the controller may command the vehicle to follow the alternative route.

Method 700 may then end.

Returning to step 745, in some examples where the engine mount(s) are active engine mounts, it may be possible to ascertain whether an engine mount that has been flagged as potentially degraded is stuck in one mode or another. Turning to FIG. 8, an example high-level method 800 is shown for determining whether inferred degradation of an engine mount is due to the engine mount being stuck in one mode or another. Thus, it may be understood that the method of FIG. 8 may in some examples be a sub-method of FIG. 7, incorporated at step 745. While method 800 at FIG. 8 is discussed with regard to an engine mount, it may be understood that similar methodology may be used for other vibrations mounts (e.g., transmission mounts, electric machine mounts, battery mounts, etc.).

Method 800 is described with reference to the systems described herein and shown in FIGS. 1-4, though it should be understood that similar methods may be applied to other systems without departing from the scope of this disclosure. Method 800 may be carried out by a controller, such as controller 12 in FIG. 1, and may be stored at the controller as executable instructions in non-transitory memory. Instructions for carrying out method 800 may be executed by the controller based on instructions stored on a memory of the controller and in conjunction with signals received from sensors of the engine system, such as the sensors described above with reference to FIGS. 1-2.

Method 800 begins at 805 an includes indicating whether the unexpected energy generation (e.g., energy generation corresponding to a particular engine mount that differs from expected energy generation by more than the predetermined threshold) is associated with driving conditions where the engine mount is commanded to the first mode, but not with driving conditions where the engine mount is commanded to the second mode. For example, as discussed above with regard to FIG. 4, in one example an active engine mount may be controlled to a first, dampening mode, or a second, stiffening mode. As discussed above at FIG. 6B, in some examples learned drive cycles may be segmented into portions of the drive cycle corresponding to the engine mount being commanded to the first mode, and into other portions where the engine mount is commanded to the second mode. If, at 805, the controller infers that the unexpected energy generation stems from segments where the engine mount is commanded to the first mode, but is not associated with segments where the engine mount is commanded to the second mode, then method 800 proceeds to 810 where it is indicated that the engine mount is potentially stuck in the second mode. In other words, because the engine vibrations are not being effectively dampened when the engine mount is commanded to the first mode, but are effectively dampened when the engine mount is commanded to the second mode, the inference may be that the engine mount is stuck in the second mode.

Returning to 805, if the unexpected energy generation is not indicated to be specific to segments where the engine mount is commanded to the first mode and not segments where the engine mount is commanded to the second mode, method 800 proceeds to 815. At 815, method 800 includes indicating whether the unexpected energy generation is associated with segments of the drive cycle where the engine mount is commanded to the second mode, but not with segments where the engine mount is commanded to the first mode. If so, method 800 proceeds to 820. At 820, method 800 includes indicating that the engine mount is potentially stuck in the first mode. In other words, because the unexpected energy generation is associated with segments where the engine mount is commanded to the second mode (but not the first mode), it may be that the engine mount is not effectively reducing engine vibrations when the engine mount is commanded to the second mode due to the engine mount being stuck in the first mode.

Returning to 815, if output from step 815 is "no", then method 800 proceeds to 825, where general or generic degradation of the engine mount is indicated. In other words, the controller may not be able to assign the unexpected energy generation as being due to the engine mount being stuck in the first mode, nor the second mode, but instead the unexpected energy generation occurs regardless of whether the engine mount is commanded to the first mode or the second mode.

Whether the controller infers that the engine mount is stuck in the first mode, the second mode, or whether there is more general degradation associated with the engine mount, method 800 proceeds to 830. At 830, method 800 includes updating operating conditions. Updating operating conditions may include setting a flag at the controller, similar to that discussed above. In some examples, a confidence factor may be assigned to the indication of potential degradation, in similar fashion as that discussed above. In one example, the confidence factor may be assigned based on a frequency with which the unexpected energy generation is associated with a particular commanded engine mount mode. For example, the greater number of times unexpected energy generation is associated with one mode but not the other, the higher the confidence factor for an indication that the engine mount is stuck in one mode but not the other.

Updating operating conditions may in some examples include illuminating a MIL at the vehicle dash, to alert the vehicle operator of a request to service the vehicle. In a case where the engine mount is stuck in the first mode, the controller may suggest alternative routes to avoid highway driving as much as possible, in one example. In another example where the engine mount is stuck in the second mode, the controller may suggest routes with a greater amount of highway driving. Method 800 may then end. It may be understood that the results of method 800 may in some examples be incorporated into the method of FIG. 7, specifically at step 745 of method 700. As discussed above, energy efficiency is paramount for hybrid vehicles. It is herein recognized that for vehicles with active engine mounts that can be commanded to, for example, a first dampening mode and a second stiffening mode, there may be a potential to increase an amount of energy generated from a particular energy harvesting module as a function of how the active engine mount is controlled. This may be advantageous in circumstances where battery SOC is low, and/or where there is demand for electricity to power one or more auxiliary electrical components of the vehicle.

Turning now to FIG. 9, a high-level example method 900 for controlling modes of an active engine mount, such as the active engine mount of FIG. 4, to increase energy generation from an energy harvesting module coupled to the active engine mount, is shown. Method 900 is described with reference to the systems described herein and shown in FIGS. 1-4, though it should be understood that similar methods may be applied to other systems without departing from the scope of this disclosure. Method 900 may be carried out by a controller, such as controller 12 in FIG. 1, and may be stored at the controller as executable instructions in non-transitory memory.

Instructions for carrying out method 900 may be executed by the controller based on instructions stored on a memory of the controller and in conjunction with signals received from sensors of the engine system, such as the sensors described above with reference to FIGS. 1-2. The controller may employ engine system actuators such as fuel injector(s) (e.g., fuel injector 66 at FIG. 1), two-way valve (e.g., two-way valve 446 at FIG. 4), etc., to alter states of devices in the physical world according to the methods depicted below.

Method 900 begins at 905 and includes evaluating current operating conditions. Operating conditions may be estimated, measured, and/or inferred, and may include one or more vehicle conditions, such as vehicle speed, vehicle location, etc., various engine conditions, such as engine status, engine load, engine speed, A/F ratio, manifold air pressure, etc., various fuel system conditions, such as fuel level, fuel type, fuel temperature, etc., various conditions related to onboard energy storage, such as a temperature of the onboard energy storage device, a current SOC of the onboard energy storage device, etc., as well as various ambient conditions, such as ambient temperature, humidity, barometric pressure, etc.

Proceeding to 910, method 900 includes indicating whether idle stop conditions are met. It may be understood that certain hybrid vehicles may include control strategy to deactivate (e.g., pull-down, or stop fuel injection and spark) the engine when predetermined conditions are met as a means for improving fuel economy. For example, idle stop conditions may be met when one or more of vehicle speed is below a threshold vehicle speed, engine speed is below a threshold engine speed, engine load is below a threshold engine load, etc. If, at 910, idle stop conditions are not indicated to be met, method 900 proceeds to 915, where current operating conditions are maintained. For example, if the vehicle is being propelled via the engine, then such operation may be maintained. In another example, if the vehicle is being propelled via the electric machine, then such operation may be maintained. In other examples, if the vehicle is being propelled via some combination of the engine and electric machine, then such operation may be maintained. Method 900 may then end.

Returning to 910, responsive to idle stop conditions being indicated to be met, method 900 proceeds to 920. At 920, method 900 includes indicating whether conditions are met for inhibiting the idle stop. Specifically, there may be certain vehicle operating conditions that may make it desirable to prevent the engine from being shut down. For example, if battery SOC is below a threshold SOC, then it may not be desirable to stop the engine, as it may be challenging to restart the engine due to the battery being depleted to below the threshold SOC. There may be other circumstances where it may be desirable to inhibit engine pulldown. Examples include but are not limited to high-anxiety circumstances (e.g., where the vehicle is making a left-handed turn into traffic, or crossing traffic), degraded battery conditions, times when a diagnostic that relies on engine manifold vacuum is in progress, etc. If, at 920, it is indicated that conditions are not met for inhibiting the idle stop, then method 900 proceeds to 925 where engine operation is discontinued.

With the engine stopped, method 900 may proceed to 930 where it is queried as to whether acceleration of the vehicle is requested. For example, acceleration may be requested via a driver depressing the accelerator pedal, or an autonomous controller (e.g., autonomous controller 225 at FIG. 2) requesting the vehicle to accelerate from stand-still. The engine may be maintained off in the absence of vehicle acceleration being requested. Alternatively, in response to acceleration of the vehicle being requested at 930, method 900 proceeds to 940 where the engine is activated to combust air and fuel, and where the engine is controlled (e.g., fuel injection, spark, timing of intake/exhaust valve opening, amount of air intake, etc.) as a function of driver demand. Method 900 then ends.

Returning to 920, responsive to conditions being met for inhibiting the idle stop, method 900 proceeds to 950. At 950, method 900 includes commanding or maintaining the active engine mounts in the first, dampening mode of operation. Specifically, with regard to the example active engine mount depicted at FIG. 4, the two-way valve (e.g., two-way valve 446 at FIG. 4) may be controlled in a manner that configures the active engine mount in the first mode.

With the active engine mount commanded to, or maintained in, the first mode, method 900 proceeds to 955. At 955, method 900 includes indicating whether increased energy generation is requested. It may be understood that increased energy generation may be in excess of energy generation produced via the engine charging the battery via a generator (e.g., alternator). In some examples, the request for increased energy generation may be due to another request for powering one or more auxiliary electrical components of the vehicle (e.g., heating, air conditioning, USB charging outlets, infotainment systems, headlights, etc.). If, at 955, increased energy generation is not requested, method 900 proceeds to 960 where the engine mount is maintained in the first mode. Method 900 then proceeds to 970, where it is queried as to whether vehicle acceleration is requested. If so, method 900 proceeds to 975, where the engine may be activated and controlled as a function of driver demand, as discussed above with regard to step 940. Method 900 may then end. Alternatively, if vehicle acceleration is not requested at 970, method 900 returns to 955, where the controller continues to assess whether additional increased energy generation is requested.

If, at 955, it is indicated that additional energy generation is requested, method 900 proceeds to 965. At 965, method 900 includes commanding the engine mount(s) to the second mode. Commanding the engine mounts to the second mode may result in engine vibrations not being as effectively dampened, which may result in energy harvesting module(s) (e.g., energy harvesting modules 151 at FIG. 1) outputting a greater amount of electricity. This greater amount of electricity may be used for example, to power the auxiliary electrical components, charge the onboard energy storage device, etc.

Continuing to 970, with the engine mount(s) commanded to the second mode, method 900 determines whether vehicle acceleration is requested. If not, then method 900 returns to 955, where the controller continues to query whether increased energy generation is requested. If not, then the controller may command the engine mount(s) back to the first mode. Alternatively, responsive to a continued request for increased energy generation, method 900 continues to 965 where engine mount(s) are maintained in the second mode.

At 970, responsive to vehicle acceleration being requested, method 900 proceeds to 975. At 975, method 900 includes updating vehicle operating conditions based on driver demand. Specifically, the engine may be activated to combust air and fuel, and the engine mounts may be controlled according to predetermined strategy. Method 900 may then end.

While not explicitly illustrated at FIG. 9, it may be understood that in other examples, it may be possible to increase energy generation under conditions where the engine mount is commanded to the second mode, by actively changing to the first mode. In such an example, it may be understood that by changing to the first mode, increased engine vibrations and/or other engine displacement may be increased as opposed to when the engine mount(s) are commanded to the second mode.

Furthermore, while the methodology of FIG. 9 related to an engine mount that is actively controlled under engine idle conditions, it may be understood that in other examples the engine mount may be controlled to increase vibrations under other conditions, such as during driving. It may be further understood that the methodology of FIG. 9 is not limited to engine mounts, but may be extended to vibration mounts coupled to other torque-supplying machines (e.g., transmission, electric machine), or even vibration mounts coupled to the traction battery (e.g., traction battery 196 at FIG. 1).

The discussion above has centered on methodology for harvesting energy from energy harvesting modules during vehicle operation, and using energy harvesting as a means for determining whether a particular vibration mount may be degraded to at least some extent, while a vehicle that the energy harvesting modules are included in is in operation. However, there may be times when it may be desirable to assess whether energy harvesting modules are producing an expected amount of energy, under circumstances where a torque-supplying machine (e.g., engine, transmission, pump, torque converter, electric machine, etc.) to which energy harvesting modules are coupled (e.g., through mounts) is not in operation. Discussed herein, a torque-supplying machine may be understood to involve a machine that contributes torque to the vehicle powertrain. Thus, as one example, the torque-supplying machine may be an engine. In another example, the torque-supplying machine may be a transmission. In yet another example, the torque-supplying machine may be an electric machine (e.g., electric machine 195 at FIG. 1).

One such example of times when it may be desirable to assess whether energy harvesting modules are producing an expected amount of energy may be when a torque-supplying machine is being shipped to a desired destination. In such an example, it is herein recognized that a torque-supplying machine that is coupled to one or more vibration mount(s) (e.g., engine mounts) that in turn are coupled to one or more energy harvesting module(s), may undergo some level of movement during the shipping process, and this movement may be monitored by the energy harvesting module(s). Energy generation in excess of an expected energy generation during the shipping process may be indicative of degraded shipping (e.g., shipping that may have resulted in degradation of one or more of the mount(s) (e.g., mounting structure(s)). In such a case, mitigating action may be taken prior to the torque-supplying machine being used (e.g., prior to a vehicle being sold with an engine that has been determined to have degraded engine mounts) to address any potential degradation.

Accordingly, at FIG. 10 a high-level example method 1000 for monitoring shipping of a torque-supplying machine via the use of one or more energy harvesting modules, is shown. It may be understood that the one or more energy harvesting modules may be coupled to a mount or mounts, such as the vibration mounts discussed above. As one example where the torque-supplying machine is an engine, the engine may be included in a vehicle in a manner where the engine is secured to the chassis as discussed above, via engine mounts. In such an example, the energy harvesting modules may be coupled to the engine mounts, in similar fashion as that discussed above. The entire vehicle may be shipped in such an example.

However, there may be other examples where a torque-supplying machine along with coupled mounts (e.g., an engine with associated engine mounts, a transmission with associated mounts, an electric machine with associated mounts, etc.)) are shipped alone. For example, where the torque-supplying machine is an engine, the engine alone along with coupled engine mounts may be shipped to a desired destination.

In a case where the torque-supplying machine (e.g., engine) is shipped along with a vehicle in which the torque-supplying machine is included, it may be understood that the controller of the vehicle (e.g., controller 12 at FIG. 1) may be relied upon for inferring an amount of energy generated from energy harvesting module(s) coupled to mounts of the torque-supplying machine in similar fashion as discussed above.

In a case where the torque-supplying machine is shipped alone (with its associated mounts), it may be understood that a stand-alone controller may be included in the packaging device for which the torque-supplying machine is shipped.

The stand-alone controller may be configured to monitor energy generated via the energy harvesting modules during the shipping process. For illustrative purposes, turning to FIG. 14, an example illustration 1400 shows an example embodiment of such a stand-alone controller included in a package that further includes a torque-supplying machine that is mounted to a platform via one or more mounts, the one or more mounts further coupled to one or more energy harvesting modules.

Specifically, at FIG. 14, torque-supplying machine 1405 (e.g., engine, transmission, electric machine, etc., which will eventually be operated after shipping) is depicted as being included within package 1407. Torque-supplying machine 1405 is depicted as being mounted to platform 1410, via mounts 1413. Mounts 1413 may be similar to the engine mounts discussed above with regard to FIG. 1 and FIGS. 2-3, for example.

One or more energy harvesting module(s) 1415 may be coupled to mounts 1413, in similar fashion as that discussed above. Specifically, energy harvesting modules 1415 may be strategically placed on mounts 1413 so as to generate electricity in response to movement of torque-supplying machine 1405 during the shipping process.

Included within package 1407 is stand-alone controller 1418. Broadly speaking, stand-alone controller 1418 may be configured to monitor electricity generated by energy harvesting modules 1415 during the shipping process. Stand-alone controller 1418 may be powered via battery 1420, for example. Energy generated by energy harvesting modules may ensure that battery 1420 does not become depleted, for example. Further included within package 1407 may be energy converter(s) 1422 (e.g. rectifiers), for converting AC current stemming from the energy harvesting modules 1415, to DC current for charging battery 1420. Stand-alone controller 1418 may be configured to monitor a charging state of battery 1420, to infer an amount of energy generated by energy harvesting modules 1415. For example, for a given time period, charge may be added to the battery via the energy harvesting modules, and charge may also be depleted via the controller using energy from the battery to operate. A difference between how much the battery is expected to be depleted by via the use of energy to power the controller as compared to an actual amount by which the battery has become depleted (or not depleted or even increased in overall charge) may represent an estimate of how much energy was added to the battery to compensate the use of energy for powering the stand-alone controller. In other examples, while not explicitly illustrated, an ammeter, ohmmeter, and/or a voltmeter may be included within package 1407 and may be electrically coupled to both the stand-alone controller and the energy harvesting modules to enable an amount of energy generation to be inferred.

Stand-alone controller 1418 may include one or more of a logic subsystem 1430, data-holding subsystem 1432, display subsystem 1434, communication subsystem 1436, and GPS module 1438.

Briefly, logic subsystem 1430 may include one or more physical devices configured to execute one or more instructions. The logic subsystem may be configured to execute one or more instructions that are part of one or more applications, services, programs, routines, libraries, objects, components, data structures, or other logical constructs. Such instructions may be implemented to perform a task, implement a data type, transform the state of one or more devices, or otherwise arrive at a desired result. The logic subsystem 1430 may include one or more processors that are configured to execute software instructions. The logic subsystems may optionally include one or more engines for processing and analyzing data.

The data-holding subsystem 1432 may include one or more physical, non-transitory devices configured to hold data and/or instructions executable by the logic subsystem 1430 to implement at least parts of the herein described methods and processes. When such methods and processes are implemented, the state of data-holding subsystem 1432 may be transformed (for example, to hold different data). The data-holding subsystem 1432 may be a physical, non-transitory device.

The display subsystem 1434 may be used to present a visual representation of data held by the data-holding subsystem 1432. As the herein described methods and processes may change the data held by the data-holding subsystem and thus transform the state of the data-holding subsystem, the state of the display subsystems may likewise be transformed to visually represent changes in the underlying data.

The communication subsystem 1436 may be configured to communicatively couple stand-alone controller 1418 with one or more other computing systems. The communication subsystem may include wired and/or wireless communication devices compatible with one or more different communication protocols. As non-limiting examples, the communication subsystem may be configured for communication via a wireless telephone network, a wireless local area network, a wired local area network, a wireless wide area network, a wired wide area network, etc. In some examples, the communication subsystems may allow controller 1418 to send and/or receive messages and/or other data to and/or from other devices and systems via network 183 such as the public Internet.

The GPS module 1438 may be capable of receiving (via a dedicated receiver) satellite signals which may enable a location of package 1407 to be accurately determined.

Returning to FIG. 10, method 1000 is described with reference to the systems described herein and shown at FIGS. 1-4, and FIG. 14, though it should be understood that similar methods may be applied to other systems without departing from the scope of this disclosure. At least parts of method 1000 may be carried out by a controller (e.g., controller 12 at FIG. 1, or stand-alone controller 1418 at FIG. 14), and may be stored at the controller as executable instructions in non-transitory memory. Instructions for carrying out method 1000 may be executed by the controller based on instructions stored on a memory of the controller.

Method 1000 begins at 1005 and includes setting a shipping threshold corresponding to expected energy generation during shipping of the torque-supplying machine, where the shipping involves the torque-supplying machine being deactivated (e.g., not operating). In other words, it may be understood that the shipping of the torque-supplying machine is not via its own power.

The shipping threshold corresponding to expected energy generation may be based on one or more of weight of the torque-supplying machine, specifications corresponding to the mounts (e.g., measures of stiffness), material that the energy harvesting modules are composed of, predetermined planned path of travel, method of travel (e.g., whether the torque-supplying machine is shipped along with a vehicle or alone in a package or box), travel means (e.g., by land, air, sea, or some combination), etc. In some examples, the shipping threshold may be set as a function of previously learned expected energy generation for similar shipping parameters and similar torque-supplying machines and associated mounts.

The shipping threshold may be a single threshold where, in an absence of degradation of the mounts occurring during or prior to shipping, energy generation for each of the energy harvesting modules is expected to be below the shipping threshold for times when energy generation is measured. For example, during shipping, the controller may be periodically woken up from a sleep mode to record energy generation from each of the energy harvesting modules.

The waking may be random, or may occur at predetermined intervals, for example. Then, after the torque-supplying machine arrives at its destination, it may be determined whether energy generation overall (e.g., for each energy harvesting module) exceeded the shipping threshold, or was maintained below the threshold. If energy generation on average (e.g., for each energy harvesting module) was maintained below the threshold, then an absence of degradation may be indicated. Alternatively, if energy generation on average (e.g., for each energy harvesting module) exceeded the threshold, then a presence of degradation may be indicated.

In another example, the shipping threshold may correspond to an expected total amount of energy generated (e.g., for each of the energy harvesting modules) over the course of the shipping process. In such an example, the controller may continuously monitor energy generation by each energy harvesting module, and at a time when shipping is complete then a total amount of actual energy generated by each energy harvesting module during the shipping process may be determined. The total amount of actual energy generated may be compared to the expected total amount of energy, and if the total amount of actual energy is not within the shipping threshold of the expected total amount of energy generated for the particular trip, then the presence of degradation of associated mounts may be inferred.

In a case where an expected total amount of energy generated is inferred, the expected total amount may be based on one or more of shipping route, whether the shipping is via land, air, sea, or some combination, weight of the torque-supplying machine, mount specifications (e.g., stiffness), whether the torque-supplying machine is included in a vehicle that is also shipped or whether the torque-supplying machine is packaged on its own (with associated mounts), total energy generated by other similar torque-supplying machines during shipping taking into account the above-mentioned variables (e.g., an average of any number of total energy generation determinations for other similarly shipped torque-supplying machines), placement with respect to the mount, etc.

With the shipping threshold set, method 1000 proceeds to 1010. At 1010, method 1000 includes collecting data via the controller during the course of the shipping operation. As discussed above, in some examples the controller may regularly or randomly be woken up for predetermined time periods in order to determine how much energy is being generated by each of the energy harvesting modules during the predetermined time periods. The data may be stored at the controller for processing.

In other examples, the controller may continually retrieve data pertaining to energy generation stemming from the energy harvesting modules, as discussed above. Again, the collected data may be stored at the controller for processing.

In some examples, rather than collecting and storing data from individual energy harvesting modules, a combined energy generation amount for all energy harvesting modules may instead be recorded. It may be understood that in such an example, the shipping threshold may be adjusted to account for expected energy generation corresponding to a plurality of energy harvesting modules.

Proceeding to 1015, method 1000 includes indicating whether the torque-supplying machine has arrived at its final destination. If not, method 1000 returns to 1010, where data is continued to be collected regarding energy generation during shipping. Alternatively, responsive to an indication that the torque-supplying machine has arrived at its final destination, method 1000 proceeds to 1020. At 1020, method 1000 includes processing the data to ascertain whether the energy generated during shipping is consistent with an expected energy generation amount or profile, or not. It may be understood that processing the data may include processing data for each energy harvesting module separately. However, in another embodiment processing the data may include processing the data as a whole (e.g., combining data collected from each energy harvesting module).

Specifically, in a case where the controller is periodically woken up to retrieve energy harvesting information, the controller may determine, on average, whether the amounts of energy generation exceed the shipping threshold or not. In a case where, on average, the energy generated is determined to exceed the shipping threshold, degradation of a vibration mount may be inferred.

In another example, where energy generation is continuously monitored throughout the shipping process, then the total actual amount of energy generated for each energy harvesting module may be compared to the expected total amount of energy for the particular trip. If the total amount of actual energy generated is not within the threshold of the expected amount, then degradation of a vibration mount may be inferred.

Accordingly, if, at 1020, actual energy generation corresponding to one or more energy harvesting modules is not consistent with the expected amount of energy generation based on the above, then method 1000 proceeds to 1030. At 1030, method 1000 includes indicating potential degradation of a vibration mount to which the energy harvesting module(s) that had energy generation that differed from expected energy generation are coupled. A flag may be set at the controller. In some examples, the controller may send the information to another computing device (e.g., via network 183 at FIG. 1 and FIG. 14) such that the results can be viewed by a technician. Discussed herein, at 1030, method 1000 may include indicating degraded shipping, for example. In other words, some aspect of the shipping process may have resulted in the degradation associated with the mount(s).

In the case of an indication of potential degradation, method 1000 proceeds to 1035. At 1035, method 1000 includes taking mitigating action. Taking mitigating action may include placing a hold on the use of the torque-supplying machine (e.g., prohibiting selling the device, prohibiting use of a vehicle in which the devices is incorporated), until the situation is addressed. For example, the particular torque-supplying machine may be assigned to a technician for inspection. The flag(s) at the controller may be cleared responsive to the issue being remedied. For example, mitigating action may include replacing any degraded mounts. Taking mitigating action may further include inspecting other aspects of the torque-supplying machine for degradation, as the issue with the mounts may lead to other aspects of the torque-supplying machine becoming degraded to some extent. For example, the method of FIG. 5 and the method of FIG. 7 may not be carried out until the issue of degradation is mitigated.

Alternatively, if at 1020, actual energy generation corresponding to one or more energy harvesting modules is consistent with the expected energy generation as discussed above, then method 1000 proceeds to 1025. At 1025, method 1000 includes indicating an absence of degradation associated with mounts coupled to the torque-supplying machine. In such a case, it may be understood that the torque-supplying machine may be sold, or otherwise used without mitigating action having to take place. Method 1000 may then end.

Thus, discussed herein, a method may comprise via a controller, monitoring an amount of energy generated over a predetermined time frame by an energy harvesting module attached to a mounting structure that is used to secure a torque-supplying machine to a frame. The method may further include comparing the amount of energy generated to an expected amount of energy generation, and indicating degradation of the mounting structure and/or the torque-supplying machine based on the comparing.

In such a method, the frame may be a chassis of a vehicle, and the torque-supplying machine may be one of an engine, an electric machine and a transmission. In such an example, the expected amount of energy generation may be learned over time as the vehicle is driven, and the predetermined time frame may be a single drive cycle of the vehicle. Alternatively, the predetermined time frame may be a time frame from when the vehicle is commenced being shipped not under its own power to a final destination. The controller may be a vehicle controller included as part of the vehicle, for example.

For such a method, the frame may in some examples be a packaging frame included in a package that the torque-supplying machine is to be shipped within, the torque-supplying machine secured to the packaging frame within the package. In such an example, the expected amount of energy generation may be based on one or more of a shipping route, a weight of the torque-supplying machine, a stiffness parameter of the mounting structure, and a composition of the energy harvesting module. In such an example, the controller may be a stand-alone controller included within the package that the torque-supplying machine is to be shipped in, and the stand-alone controller may be powered at least in part via the amount of energy generated over the predetermined time frame.

For such a method, the energy harvesting module may be comprised of a piezoelectric material.

For such a method, the controller may request mitigating action to be taken responsive to the degradation of the mounting structure and/or the torque-supplying machine, and the mitigating action may include servicing the mounting structure and/or the torque-supplying machine to correct the degradation.

As another example, a method may comprise during shipping of a torque-supplying machine not under its own power, the torque-supplying machine having one or more vibration mounts with one or more mechano-electric conversion modules, indicating degraded shipping based on a first set of signals from the one or more mechano-electric conversion modules, and during operation of the torque-supplying machine, indicating degradation of the one or more vibration mounts and/or the torque-supplying machine based on a second set of signals from the one or more mechano-electric conversion modules.

For such a method, the first set of signals may be acquired over a course of shipping the torque-supplying machine and may relate to a first amount of energy generated by the mechano-electric conversion modules. In such an example, indicating degraded shipping based on the first set of signals may include indicating degraded shipping responsive to, on average, the first amount of energy exceeding a shipping threshold related to an expected amount of energy generated by the mechano-electric conversion modules during shipping.

For such a method, the second set of signals may be acquired over a predetermined time frame in which the torque-supplying machine is operated and relate to a second amount of energy generated by the mechano-electric conversion modules. In such an example, indicating degradation of the one or more vibration mounts and/or the torque-supplying machine based on the second set of signals may include indicating degradation responsive to the second amount of energy generated differing from an expected amount of energy generated during the predetermined time frame by more than a predetermined threshold. The expected amount of energy generated during the predetermined time frame may be learned over time, for example.

For such a method, the mechano-electric conversion modules may be comprised of a piezoelectric material.

Turning now to FIG. 11, depicted is a prophetic example timeline 1100, illustrating how energy generated by one or more energy harvesting modules may be monitored during a drive cycle in order to infer whether an associated engine mount is degraded, or not, as discussed above with regard to the methodology of FIGS. 7-8. While discussed with regard to an engine mount, it may be understood that a similar prophetic timeline may apply to a transmission mount, electric machine mount, etc. Timeline 1100 includes plot 1105, indicating whether the engine mount is commanded to a first mode, or a second mode, over time. Thus, it may be understood that the engine mount of example timeline 1100 is an active engine mount of a type discussed with regard to FIG. 4. Discussed herein, it may be understood that the first mode corresponds to a dampening mode, and the second mode corresponds to a stiffening mode, discussed above at FIG. 4. Timeline 1100 further includes plot 1110, indicating an actual energy generation amount for a single energy harvesting module (e.g., energy harvesting module 151 at FIG. 1) coupled to the mount associated with plot 1105, over time. Timeline 1100 further includes plot 1115, indicating an expected amount of energy generated, over time. The expected amount of energy may correspond to a learned amount of energy for the particular route that the vehicle is traveling along. In other words, for example timeline 1100, it may be understood that the vehicle is traveling a learned route, where the expected amount of energy for the particular engine mount also represents an amount/profile learned over time. With regard to plots 1110 and 1115, there may be no energy generation (0), or energy generation may be greater (+) than none. Timeline 1100 further includes plot 1120, indicating whether the drive cycle is complete (yes or no), over time. Timeline 1100 further includes plot 1125, indicating whether there is an indication of engine mount degradation (yes or no), over time. Timeline 1100 further includes plot 1130, indicating whether the particular engine mount associated with the energy harvesting module for which energy generation is monitored (see plot 1110), is stuck in the first mode, or the second mode.

At time t0, it may be understood that the vehicle is traveling along a learned route. The engine mount is commanded to the second mode (plot 1105). The drive cycle is not complete (plot 1120), there is no indication of degradation (plot 1125), and the engine mount is not yet indicated to be stuck in any one position (plot 1130).

Between time t0 and t1, the actual amount of energy generated (plot 1110) is within a predetermined threshold (represented by line 1111) of the expected amount of energy generation.

At time t1, the engine mount mode is changed to the first, dampening mode. This may occur, for example, in response to the vehicle slowing to below a predetermined speed, the vehicle entering into an idle speed mode, etc. Between time t1 and t2, the actual amount of energy generated differs from the expected amount of energy generation by more than the predetermined threshold.

At time t2, the engine mount mode is switched back to the second mode. This may occur, for example, in response to the vehicle speed increasing above another predetermined speed, for example. With the engine mount commanded to the second mode, actual energy generated is again within the threshold of the expected amount of energy generation.

At time t3, the engine mount is again switched back to the first mode. With the engine mount commanded to the first mode, actual energy generated again exceeds the threshold from expected amount of energy generation.

At time t4, the drive cycle ends (plot 1120). The controller processes the data, and infers degradation of the engine mount (plot 1125). The degradation is inferred to be due to the engine mount being stuck in the second mode of operation (plot 1130). Specifically, because the actual energy generation amount consistently differed by more than the predetermined threshold when the engine mount was commanded to the first mode, as opposed to when the engine mount was commanded to the second mode, the controller infers that the engine mount is not effectively being switched to the first mode, which is resulting in excessive and unexpected engine vibration. The unexpected engine vibration results in the energy harvesting module outputting more energy than otherwise expected, and thus it is inferred that the mount is stuck in the second mode.

Turning now to FIG. 12, depicted is another prophetic example timeline 1200, illustrating how an active engine mount (e.g., active engine mount 300 at FIGS. 3-4) that includes an associated energy harvesting module (e.g., energy harvesting module 151 at FIG. 1) may be purposefully controlled in a manner that results in the associated energy harvesting module generating additional energy, as discussed above with regard to FIG. 9. Timeline 1200 includes plot 1205, indicating engine status (on or off), over time. When the engine is "on", it may be understood that the engine is combusting air and fuel. Timeline 1200 further includes plot 1210, indicating vehicle speed (e.g., miles per hour), over time. The vehicle may be stopped (0), or may be traveling at a speed greater than (+) stopped. Timeline 1200 further includes plot 1215, indicating whether there is a request to inhibit an engine idle stop (yes, no or non-applicable), over time. It may be understood, as discussed above, that an idle stop may include deactivation of the engine when certain conditions are met (e.g., vehicle speed below a threshold speed, represented at FIG. 12 by line 1211). Timeline 1200 further includes plot 1220, indicating whether the active engine mount is controlled to the first mode (e.g., dampening mode), or second mode (e.g., stiffening mode), over time. Timeline 1200 further includes plot 1225, indicating an actual battery SOC, over time, and plot 1226, indicating a threshold SOC. It may be understood that when battery SOC is below the threshold SOC, then it may be desirable to inhibit an engine idle stop routine. Timeline 1200 further includes plot 1230, indicating whether there is a request for auxiliary electrical power (yes or no), over time. Timeline 1200 further includes plot 1235, indicating whether additional energy generation is requested (yes or no), over time.

At time t0, the vehicle is in operation with the engine combusting air and fuel (plot 1205). The active engine mount is in the first mode (plot 1220), and battery SOC is less than the threshold SOC (refer to plots 1225 and 1226, respectively). Auxiliary electrical power is not requested (plot 1230), and additional energy generation from the energy harvesting module is not requested (plot 1235).

Between time t0 and t1, vehicle speed slows, and at time t1 vehicle speed drops below the threshold speed. However, due to the battery SOC being below the threshold SOC, the controller requests the idle stop be inhibited. In other words, the controller commands the engine to be maintained activated.

At time t2, the vehicle operator requests auxiliary electrical power. For example, the vehicle operator may request air conditioning, heat, etc. Due to the auxiliary electrical power request, the controller determines that it may be desirable to generate additional electrical power to meet the request for auxiliary electrical power. Accordingly, at time t2, the engine mount is commanded from the first mode (where engine vibrations at idle are effectively dampened), to the second mode (where engine vibrations at idle are less effectively dampened). While not explicitly illustrated, the additional electrical energy generated via the induced engine vibration may be allocated to the auxiliary electrical power request, while the engine operation is used to charge the battery. If additional energy were not contributed from the increased engine vibration, then the auxiliary power request may draw energy from the battery while the engine is being used to charge the battery, which may degrade fuel economy and adversely impact the charging operation. Instead, battery SOC climbs after time t2 to above the battery SOC as the engine operation charges the battery.

Turning now to FIG. 13, depicted is another prophetic example timeline 1300, illustrating how energy generation from an energy harvesting module (e.g., energy harvesting module 151 at FIG. 1) may be used as a monitoring tool during shipping of a torque-supplying machine to ascertain whether the process of shipping was degraded, resulting in degradation of associated mount(s) and/or other componentry of the torque-supplying machine, as discussed with regard to the method of FIG. 10. Timeline 1300 includes plot 1305, indicating status of the torque-supplying machine (e.g., engine, transmission, electric machine, etc.), over time. The torque-supplying machine may be on or off, over time. Timeline 1300 further includes plot 1310, indicating whether the torque-supplying machine is in transit (yes or no), or in other words, is in the process of being shipped. In this example timeline, it may be understood that the torque-supplying machine is an engine that is included in a vehicle and is secured to the vehicle chassis via engine mounts (e.g., vibration mounts 133 at FIG. 1). Furthermore, it may be understood that the engine mounts include associated energy harvesting module(s) (e.g., energy harvesting module 151 at FIG. 1). Timeline 1300 further includes plot 1315, indicating a status of the controller (e.g., controller 12 depicted at FIG. 1) (awake or asleep), over time. Timeline 1300 further includes plot 1320, indicating actual energy generation corresponding to an energy harvesting module coupled to an engine mount, over time. When the controller is asleep, energy generated from the energy harvesting module is not recorded, thus any energy generated is referred to in this example timeline as non-applicable (n/a). Alternatively, when the controller is awake, energy generation is recorded via the controller, and increases along the y-axis. Timeline 1300 further includes plot 1325, indicating whether there is inferred degradation (yes, no or non-applicable) associated with the mount to which the energy harvesting module is coupled, over time.

At time t0, the engine is off (plot 1305), and the process of shipping the engine and vehicle has not yet begun. At time t1, the engine begins being shipped (plot 1310), but the controller is maintained asleep. At time t2, the controller is awoken, and energy generation is recorded (plot 1320) until time t3, when the controller is again slept. The controller sleeps between time t3 and t4, and at time t4 the controller is once again awoken. Between time t4 and t5, the controller again records energy generation from the energy harvesting module. At time t5, the controller is again slept until time t6, where the controller is awoke to record energy generation between time t6 and t7. At time t7, the controller is slept until time t8, when the controller is awoken to record energy generation between time t8 and t9. At time t9, the controller is again slept until time t10, when the controller is awoken again to record energy generation between time t10 and t11. At time t11, the controller is again slept. At time t12, the shipping process ends, due to the device arriving at the desired destination.

It may be understood that, while timeline 1300 depicts the controller being awoken to record energy generation five times, such an example is meant to be illustrative. It may be understood that the controller may be awoken any number of times during the course of shipping, where a greater number of time that energy generation is recorded, a greater a confidence in a determination as to whether there was degraded shipping or not.

At time t12, the controller assesses whether, on average, energy generation was greater than a shipping threshold represented by line 1321, or less than the shipping threshold. In this example timeline, on average the energy generation exceeded the shipping threshold for energy generation, and thus degradation is indicated at time t12 (plot 1325). Accordingly, while not explicitly illustrated, mitigating action may be taken to address the degradation prior to the vehicle being operated.

In this way, energy harvesting module(s) may be used to generate electricity during any number of operating conditions of a vehicle, which may be particularly advantageous for hybrid electric vehicles where energy usage is a critical parameter for improving fuel economy. Furthermore, the same energy harvesting module(s) may be used to monitor amounts of energy generation during particular drive cycles, and actual energy generation may be compared to expected energy generation, to infer whether there is potential degradation of one or more vehicle components (e.g., degradation of mounts to which the energy harvesting module(s) are coupled).

The technical effect of relying on energy harvesting modules to infer degradation is that potential degradation may be inferred earlier than the degradation may otherwise be inferred, which may reduce or eliminate undesirable downstream effects stemming from the degradation.

For example, in a case where the energy harvesting module(s) are coupled to engine mounts, inferring degradation of an engine mount or mounts at an earlier time point may enable mitigating action to be taken prior to a point where the engine mount degradation begins to impact other vehicular components (e.g., increased vibration may result in exhaust system degradation). A further technical effect is that by relying on energy harvesting module(s) to infer degradation, it may be possible to infer whether shipping conditions of a particular torque-supplying machine (e.g., engine included in a vehicle, or alone) may have resulted in degradation of the torque-supplying machine itself or mounting structures associated with the torque-supplying machine.

The systems and methods discussed herein may enable one or more systems and one or more methods. In one example a method comprises via a controller, monitoring an amount of energy generated over a predetermined time frame by an energy harvesting module attached to a mounting structure that is used to secure a torque-supplying machine to a frame; comparing the amount of energy generated to an expected amount of energy generation; and indicating degradation of the mounting structure and/or the torque-supplying machine based on the comparing. In a first example of the method, the method further includes wherein the frame is a chassis of a vehicle, and where the torque-supplying machine is one of an engine, an electric machine and a transmission. A second example of the method optionally includes the first example, and further includes wherein the expected amount of energy generation is learned over time as the vehicle is driven; and wherein the predetermined time frame is a single drive cycle of the vehicle. A third example of the method optionally includes any one or more or each of the first though second examples, and further includes wherein the predetermined time frame is a time frame from when the vehicle is commenced being shipped not under its own power to a final destination. A fourth example of the method optionally includes any one or more or each of the first through third examples, and further includes wherein the controller is a vehicle controller included as part of the vehicle. A fifth example of the method optionally includes any one or more or each of the first through fourth examples, and further includes wherein the frame is a packaging frame included in a package that the torque-supplying machine is to be shipped within, the torque-supplying machine secured to the packaging frame within the package. A sixth example of the method optionally includes any one or more or each of the first through fifth examples, and further includes wherein the expected amount of energy generation is based on one or more of a shipping route, a weight of the torque-supplying machine, a stiffness parameter of the mounting structure, and a composition of the energy harvesting module. A seventh example of the method optionally includes any one or more or each of the first through sixth examples, and further includes wherein the controller is a stand-alone controller included within the package that the torque-supplying machine is to be shipped in; and wherein the stand-alone controller is powered at least in part via the amount of energy generated over the predetermined time frame. An eighth example of the method optionally includes any one or more or each of the first through seventh examples, and further includes wherein the energy harvesting module is comprised of a piezoelectric material. A ninth example of the method optionally incudes any one or more or each of the first through eighth examples, and further includes wherein the controller requests mitigating action to be taken responsive to the degradation of the mounting structure and/or the torque-supplying machine, where the mitigating action includes servicing the mounting structure and/or the torque-supplying machine to correct the degradation.

Another example of a method may comprise during shipping of a torque-supplying machine not under its own power, the torque-supplying machine having one or more vibration mounts with one or more mechano-electric conversion modules, indicating degraded shipping based on a first set of signals from the one or more mechano-electric conversion modules; and during operation of the torque-supplying machine, indicating degradation of the one or more vibration mounts and/or the torque-supplying machine based on a second set of signals from the one or more mechano-electric conversion modules. In a first example of the method, the method may further include wherein the first set of signals are acquired over a course of shipping the torque-supplying machine and relate to a first amount of energy generated by the mechano-electric conversion modules; and wherein indicating degraded shipping based on the first set of signals includes indicating degraded shipping responsive to, on average, the first amount of energy exceeding a shipping threshold related to an expected amount of energy generated by the mechano-electric conversion modules during shipping. A second example of the method optionally includes the first example, and further includes wherein the second set of signals are acquired over a predetermined time frame in which the torque-supplying machine is operated and relate to a second amount of energy generated by the mechano-electric conversion modules; and wherein indicating degradation of the one or more vibration mounts and/or the torque-supplying machine based on the second set of signals includes indicating degradation responsive to the second amount of energy generated differing from an expected amount of energy generated during the predetermined time frame by more than a predetermined threshold. A third example of the method optionally includes any one or more or each of the first through second examples, and further includes wherein the expected amount of energy generated during the predetermined time frame is learned over time. A fourth example of the method optionally includes any one or more or each of the first through third examples, and further includes wherein the mechano-electric conversion modules are comprised of a piezoelectric material.

An example of a system comprises a torque-supplying machine secured to a frame via one or more vibration mounts, the one or more vibration mounts including one or more mechano-electric conversion modules; and a controller with computer readable instructions stored on non-transitory memory that, when executed, cause the controller to: determine an actual amount of energy generated via the one or more mechano-electric conversion modules during a predetermined timeframe; compare the amount of energy generated to an expected amount of energy predicted to be generated during the same predetermined timeframe; indicate degradation of the torque-supplying machine and/or the one or more vibration mounts responsive to the actual amount of energy generated during the predetermined timeframe differing from the expected amount of energy predicted to be generated during the same predetermined timeframe by more than a threshold difference; and request mitigating action responsive to degradation of the torque-supplying machine and/or the one or more vibration mounts being indicated. In a first example of the system, the system further includes wherein the one or more mechano-electric conversion modules are comprised of one or more of polyvinylidene fluoride, zinc oxide, cadmium sulfate, indium nitride, sodium niobate, lead zirconate titanate, barium titanate, and lithium niobate. A second example of the system optionally includes the first example, and further comprises a vehicle, where the torque-supplying machine is one of an engine, a transmission, and an electric machine and the frame is a chassis of the vehicle; an onboard navigation system included as part of the vehicle; one or more driving sensors of the vehicle; and wherein the controller is a vehicle controller that stores further instructions to learn a set of driving routes commonly traveled by the vehicle based on information acquired by the controller in conjunction with the onboard navigation system and the one or more driving sensors, where the predetermined timeframe corresponds to a single driving route of the set of driving routes. A third example of the system optionally includes any one or more or each of the first through second examples, and further includes wherein the controller stores further instructions to learn the expected amount of energy predicted to be generated for each of the single driving routes. A fourth example of the system optionally includes any one or more or each of the first through third examples, and further includes wherein the predetermined timeframe corresponds to a shipping of the torque-supplying machine from a first starting location to a second ending destination.

In another representation, a method for a hybrid electric vehicle includes controlling an active engine mount based on a request for an increased amount of electrical energy generation. In a first example of the method, the active engine mount is controllable between a first, dampening mode, and a second, stiffening mode. In a second example of the method, the active engine mount is coupled to an energy harvesting module that generates electricity based on mechanical displacement of the active engine mount. In other words, the active engine mount may be capable of mechano-electric conversion. In a third example of the method, controlling the active engine mount based on the request for the increased amount of electrical energy generation includes controlling the active engine mount to a mode that increases vibration associated with engine operation and/or driving conditions.

In yet another representation, a method for a hybrid electric vehicle includes indicating that an active engine mount is stuck in one of a first mode or a second mode based on comparing an actual amount of energy generated via an energy harvesting module coupled to the active engine mount to an expected amount of energy generated via the energy harvesting module during a drive cycle where the active engine mount is commanded to both the first mode and to the second mode. In a first example of the method, the active engine mount is indicated to be stuck in the first mode responsive to the actual amount of energy being within a threshold of the expected amount of energy when the active engine mount is commanded to the first mode, but not when the active engine mount is commanded to the second mode. In a second example of the method, the active engine mount is indicated to be stuck in the second mode responsive to the actual amount of energy being within a threshold of the expected amount of energy when the active engine mound is commanded to the second mode, but not when the active engine mount is commanded to the first mode. In a third example of the method, the expected amount of energy generated during the drive cycle represents a learned amount of energy for the drive cycle.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations, and/or functions may be repeatedly performed depending on the particular strategy being used. Further, the described actions, operations, and/or functions may graphically represent code to be programmed into non-transitory memory of the computer readable storage medium in the engine control system, where the described actions are carried out by executing the instructions in a system including the various engine hardware components in combination with the electronic controller.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

As used herein, the term "approximately" is construed to mean plus or minus five percent of the range unless otherwise specified.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method comprising:
via a controller, monitoring an amount of energy generated over a predetermined time frame by an energy harvesting module attached to a mounting structure that is used to secure a torque-supplying machine to a frame, the energy generated by the energy harvesting module from vibrations applied to the energy harvesting module;
comparing the amount of energy generated to an expected amount of energy generation; and
indicating degradation of the mounting structure and/or the torque-supplying machine based on the comparing.

2. The method of claim 1, wherein the frame is a chassis of a vehicle, and where the torque-supplying machine is one of an engine, an electric machine and a transmission.

3. The method of claim 2, wherein the expected amount of energy generation is learned over time as the vehicle is driven; and
wherein the predetermined time frame is a single drive cycle of the vehicle.

4. The method of claim 2, wherein the predetermined time frame is a time frame from when the vehicle is commenced being shipped not under the vehicle's power to a final destination.

5. The method of claim 2, wherein the controller is a vehicle controller included as part of the vehicle.

6. The method of claim 1, wherein the frame is a packaging frame included in a package that the torque-supplying machine is to be shipped within, the torque-supplying machine secured to the packaging frame within the package.

7. The method of claim 6, wherein the expected amount of energy generation is based on one or more of a shipping route, a weight of the torque-supplying machine, a stiffness parameter of the mounting structure, and a composition of the energy harvesting module.

8. The method of claim 6, wherein the controller is a stand-alone controller included within the package that the torque-supplying machine is to be shipped in; and
wherein the stand-alone controller is powered at least in part via the amount of energy generated over the predetermined time frame.

9. The method of claim 1, wherein the energy harvesting module is comprised of a piezoelectric material.

10. The method of claim 1, wherein the controller requests mitigating action to be taken responsive to the degradation of the mounting structure and/or the torque-supplying machine, where the mitigating action includes servicing the mounting structure and/or the torque-supplying machine to correct the degradation.

11. A system comprising:
a torque-supplying machine secured to a frame via one or more vibration mounts, the one or more vibration mounts including one or more mechano-electric conversion modules; and
a controller with computer readable instructions stored on non-transitory memory that, when executed, cause the controller to:
determine an actual amount of energy generated via the one or more mechano-electric conversion modules during a predetermined timeframe;
compare the amount of energy generated to an expected amount of energy predicted to be generated during the same predetermined timeframe;
indicate degradation of the torque-supplying machine and/or the one or more vibration mounts responsive to the actual amount of energy generated during the predetermined timeframe differing from the expected amount of energy predicted to be generated during the same predetermined timeframe by more than a threshold difference; and
request mitigating action responsive to degradation of the torque-supplying machine and/or the one or more vibration mounts being indicated.

12. The system of claim 11, wherein the one or more mechano-electric conversion modules are comprised of one or more of polyvinylidene fluoride, zinc oxide, cadmium sulfate, indium nitride, sodium niobate, lead zirconate titanate, barium titanate, and lithium niobate.

13. The system of claim 11, further comprising:
a vehicle, where the torque-supplying machine is one of an engine, a transmission, and an electric machine and the frame is a chassis of the vehicle;
an onboard navigation system included as part of the vehicle; and
one or more driving sensors of the vehicle;
wherein the controller is a vehicle controller that stores further instructions to learn a set of driving routes commonly traveled by the vehicle based on information acquired by the controller in conjunction with the onboard navigation system and the one or more driving sensors, where the predetermined timeframe corresponds to a single driving route of the set of driving routes.

14. The system of claim 13, wherein the controller stores further instructions to learn the expected amount of energy predicted to be generated for each of the single driving routes.

15. The system of claim 11, wherein the predetermined timeframe corresponds to a shipping of the torque-supplying machine from a first starting location to a second ending destination.

* * * * *